United States Patent
Ito et al.

(10) Patent No.: US 7,701,085 B2
(45) Date of Patent: Apr. 20, 2010

(54) GRID INTERCONNECTION DEVICE, GRID INTERCONNECTION SYSTEM AND POWER CONTROL SYSTEM

(75) Inventors: Kazuo Ito, Hirakata (JP); Masahiro Makino, Nara (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 49 days.

(21) Appl. No.: 12/128,774

(22) Filed: May 29, 2008

(65) Prior Publication Data
US 2008/0296973 A1    Dec. 4, 2008

(30) Foreign Application Priority Data
May 30, 2007    (JP)    ............................. 2007-144092
May 15, 2008    (JP)    ............................. 2008-128531

(51) Int. Cl.
*H02J 1/10*    (2006.01)
(52) U.S. Cl. .............................. 307/29; 307/85; 700/286
(58) Field of Classification Search .................. 700/61, 700/286, 22; 702/61; 307/85, 147, 29
See application file for complete search history.

(56) References Cited

U.S. PATENT DOCUMENTS

| | | |
|---|---|---|
| 5,592,074 A | 1/1997 | Takehara |
| 5,977,659 A | 11/1999 | Takehara et al. |
| 2004/0111226 A1 | 6/2004 | Brewster et al. |
| 2005/0275979 A1 | 12/2005 | Xu |
| 2007/0086133 A1 | 4/2007 | Loucks et al. |

FOREIGN PATENT DOCUMENTS

| | | |
|---|---|---|
| EP | 0072598 A | 2/1983 |
| JP | 3240215 B | 10/2001 |
| WO | WO 99/09632 A | 2/1999 |

*Primary Examiner*—Albert W Paladini
*Assistant Examiner*—Daniel Cavallari
(74) *Attorney, Agent, or Firm*—Marvin A. Motsenbocker; MOTS Law, PLLC

(57) ABSTRACT

The grid interconnection device connected to the bank where alternating-current power is transmitted and to the power supply device provided to a customer includes: a detector detecting start of the alternating-current power transmission based on a state of the alternating-current power; a receiver receiving a grid interconnection start instruction for starting grid interconnection between the bank and the power supply device; and a grid interconnection controller controlling the bank and the power supply device to be interconnected or separated, in which the grid interconnection controller starts grid interconnection between the bank and the power supply device upon receipt of the grid interconnection start instruction in a state where the start of the alternating-current power transmission is detected.

10 Claims, 14 Drawing Sheets

GRID INTERCONNECTION DEVICE, GRID INTERCONNECTION SYSTEM AND POWER CONTROL SYSTEM

CROSS REFERENCE TO RELATED APPLICATIONS

This application is based upon and claims the benefit of priority from prior Japanese Patent Application No. 2007-144092, filed on May 30, 2007; and prior Japanese Patent Application No. 2008-128531, filed on May 15, 2008; the entire contents of which are incorporated herein by reference.

BACKGROUND OF THE INVENTION

1. Field of the Invention

The present invention relates to a grid interconnection device connected to a power distribution system through which alternating-current power is transmitted and to a power supply device provided to a customer, to a grid interconnection system, and to a power control system.

2. Description of the Related Art

A number of customers (for example, houses or plants) are increasing, which are provided with alternating-current power from a substation have their own power generation devices (for example, solar power generation systems).

Specifically, a plurality of power distribution systems (hereinafter referred to as banks) are provided under a substation, and each bank has customers having their own power generation devices. Here, electric power generated by the power generation devices is not only consumed by power consumption devices (for example, home electric appliances) provided to the customers but may also be transmitted to other customers (i.e., to the bank side). A system that connects power generation devices and a bank to supply electric power to each other as described above is referred to as a grid interconnection system.

In the grid interconnection system, when transmission of alternating-current power from a substation is stopped, for example, when a power failure occurs, power system separate processing for separating the power generation devices from the bank is carried out. On the other hand, when transmission of alternating-current power from a substation is started, for example, when the power failure is restored, grid interconnection processing for connecting the power generation devices to the bank is carried out.

Here, as a method for detecting that the transmission of alternating-current power is stopped (or that the transmission thereof is restored), there has been known a method that monitors, on the customer side, a state of alternating-current power to be transmitted through the bank. Specifically, the customer detects that the transmission of alternating-current power is stopped (or that the transmission thereof is restored) through monitoring data such as a change in voltage, or a change in phase of the voltage or a change in frequency, with regard to the alternating-current power transmitted through the bank.

In addition, there has been proposed a technique in which an operator of a power company or the like transmits, to the customers through wireless communication, a signal instructing the customers to stop their power generation devices (see, for example, Japanese Patent No. 3240215 (claim 1, paragraph [0019], FIG. 1, and the like)).

Specifically, the operator transmits, through wireless communication, area information specifying an area to be instructed to stop the power generation devices. Then, the customers determine whether to stop the power generation devices depending on whether they are included in the area specified by the area information.

Of the electric power generated by the power generation devices, an electric power amount to be transmitted to the bank is generally controlled based on standards predetermined by the guideline in order to prevent an excessive load from being applied on a power transmission line.

In the case where the transmission of alternating-current power is restored after the transmission of alternating-current power is stopped, the customers start interconnecting their power generation devices to the bank all at once. If numbers of the power generation devices start the grid interconnection all at once, a voltage of the bank rises so sharply that it becomes out of the control carried out based on the standards predetermined by the guideline. Consequently, the electric power amount to be transmitted to the bank could temporarily become excessively large.

That is to say, it is likely that an excessive load is applied on the power transmission line by the electric power to be transmitted from the customers to the bank in a case where the transmission of alternating-current power is restored.

SUMMARY OF THE INVENTION

One aspect of the present invention provides a grid interconnection device (grid interconnection device 100) connected to a power distribution system (bank) through which alternating-current power is transmitted and to a power supply device (power generation device 32 or electric storage device 34) provided to a customer (customer 30). The grid interconnection device includes: a detector (detector 101) configured to detect a start of transmission of the alternating-current power based on a state of the alternating-current power; a receiver (receiver 102) configured to receive a grid interconnection start instruction for starting grid interconnection between the power distribution system and the power supply device, through a predetermined transmission path; and a controller (grid interconnection controller 105) configured to control grid interconnection and power system separate of the power distribution system and the power supply device. The controller starts grid interconnection between the power distribution system and the power supply device upon receipt of the grid interconnection start instruction in a state where the detector detects the start of transmission of the alternating-current power.

Here, the state of the alternating-current power means, for example, a voltage, a phase difference between voltage and current, a frequency, a change in voltage, a change in phase of voltage, a change in frequency, and the like. The detector detects the start of alternating-current power transmission depending on whether or not, for example, a voltage, a phase difference between voltage and current, a frequency, a change in voltage, a change in phase of voltage, a change in frequency, and the like is within a tolerance of commercial power.

According to the above-described aspect, the controller starts grid interconnection between the power distribution system and the power supply device upon receipt of the grid interconnection start instruction in a state where the start of transmission of alternating-current power is detected through the power distribution system. Accordingly, it is prevented that the customer starts grid interconnection as needed, so that an excessive load is applied on a power transmission line.

Thus, when the transmission of alternating-current power is restored, grid interconnection between the power distribution system (bank) and the power supply device can be started while an excessive load is prevented from being applied on the power transmission line.

In the above-described aspect of the present invention, the grid interconnection start instruction includes information specifying the power supply device which starts the grid interconnection with the power distribution system. The controller starts the grid interconnection of the power supply device specified by the grid interconnection start instruction.

In the above-described aspect of the present invention, the controller prepares for grid interconnection of the power supply device other than the power supply device specified by the grid interconnection start instruction.

In the above-described aspect of the present invention, the grid interconnection start instruction includes information specifying the type of the power supply device.

In the above-described aspect of the present invention, the grid interconnection start instruction includes area information specifying an area in which grid interconnection between the power distribution system and the power supply device to be started. The controller starts grid interconnection of the power supply device, when the area specified by the area information is its own area.

In the above-described aspect of the present invention, the controller prepares for grid interconnection between the power distribution system and the power supply device, when the area specified by the area information is an area adjacent to its own area.

In the above-described aspect of the present invention, the power supply device includes a plurality of power supply devices. The order of starting grid interconnection of the plurality of power supply devices is determined based on a load state of a power consumption device provided to the customer and a power supply amount of the a plurality of power supply devices. Moreover, the power supply amount is a power amount to be so supplied from the plurality of the power supply device. The power supply amount is a power generation amount of a power generation device or an electric charge amount of an electric storage device.

In the above-described aspect of the present invention, the grid interconnection start instruction includes information on a power supply as amount specifying the power supply amount of the power supply device starting grid interconnection with the power distribution system. The controller starts grid interconnection between the power distribution system and the power supply device based on the information on the power supply amount, when the area specified by the area information is its own area.

One aspect of the present invention provides a grid interconnection system in which a grid interconnection device connected to a power distribution system through which alternating-current power is transmitted and to a power supply device connected to the grid interconnection device are included. In the grid interconnection system, the grid interconnection device includes: a detector configured to detect a start of transmission of the alternating-current power based on a state of the alternating-current power; a receiver configured to receive a grid interconnection start instruction for starting grid interconnection between the power distribution system and the power supply device, through a predetermined transmission path; and a controller configured to control grid interconnection and power system separate of the power distribution system and the power supply device. In the grid interconnection device, the controller starts grid interconnection between the power distribution system and the power supply device upon receipt of the grid interconnection start instruction in a state where the detector detects the start of transmission of the alternating-current power.

One aspect of the present invention provides a power control system includes a grid interconnection device connected to a power distribution system through which alternating-current power is transmitted; a power supply device connected to the grid interconnection device; and a transmission device configured to transmit a grid interconnection start instruction for starting grid interconnection between the power distribution system and the power supply device, through a predetermined transmission path. The grid interconnection device includes: a detector configured to detect a start of transmission of the alternating-current power based on a state of the alternating-current power; a receiver configured to receive the grid interconnection start instruction through the predetermined transmission path from the transmission device; a controller configured to control grid interconnection and power system separate of the power distribution system and the power supply device. The controller starts grid interconnection between the power distribution system and the power supply device upon receipt of the grid interconnection start instruction in a state where the detector detects the start of transmission of the alternating-current power.

DESCRIPTION OF THE PREFERRED EMBODIMENTS

Figure 1:
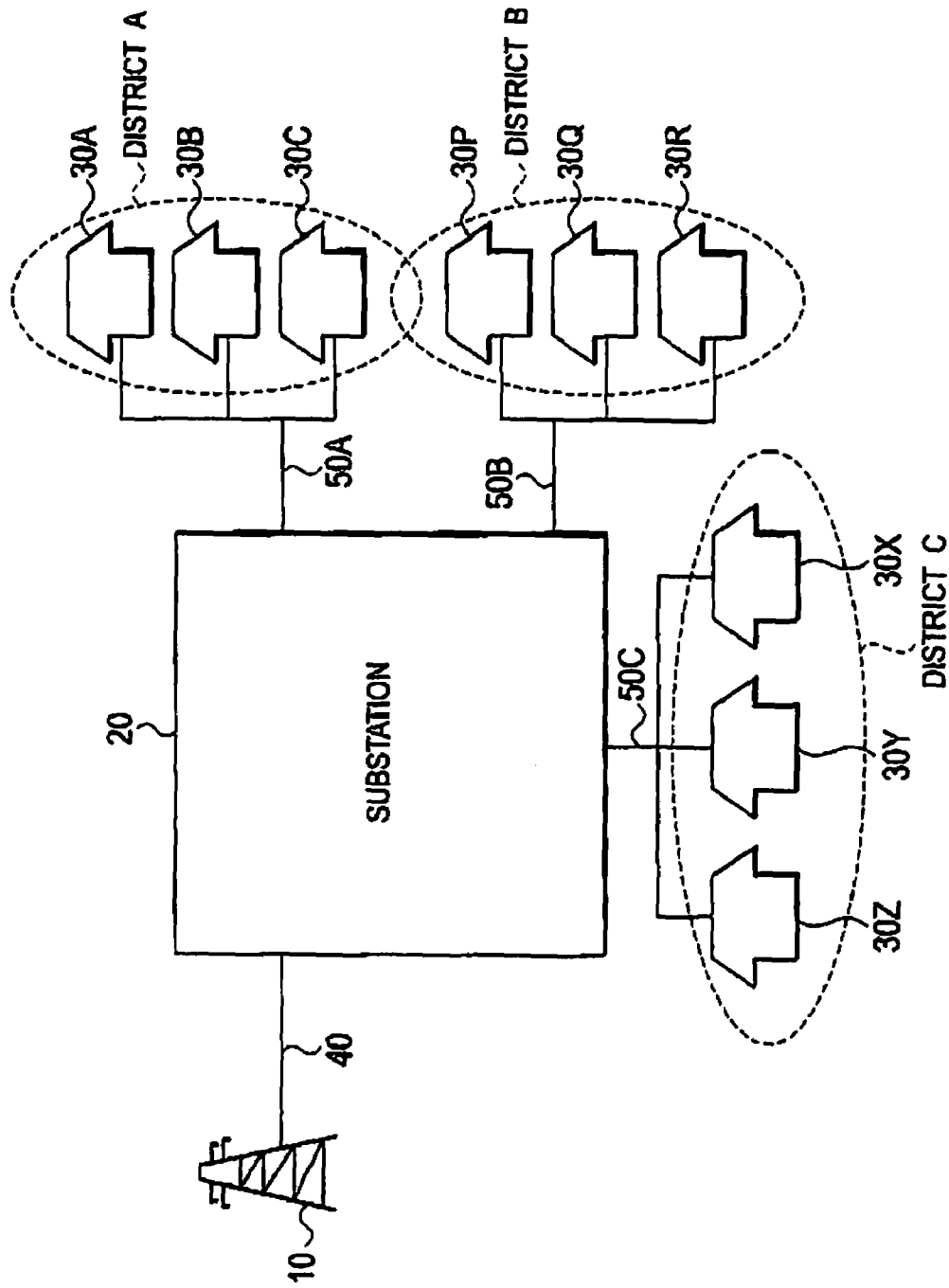
FIG. 1 is a schematic view showing the configuration of a power transmission system according to a first embodiment.

A grid interconnection system according to embodiments of the present invention will be described below by referring to the drawings. Note that in the description in the following drawings, same or similar reference numerals denote same or similar portions in the drawings.

However, it should be noted that the drawings are merely schematically shown and proportions of sizes and the like are different from actual ones. Thus, specific sizes and the like should be determined by referring to the description below. Naturally, there are portions where relationships or proportions of sizes of the drawings are different from one another.

First Embodiment (Configuration of a Power Transmission System)

The configuration of a power transmission system according to a first embodiment will be described below by referring to the drawings. FIG. 1 is a schematic view showing the configuration of the power transmission system according to the first embodiment.

As shown in FIG. 1, the power transmission system includes a high-voltage power source 10, a substation 20, and a plurality of customers 30.

The high-voltage power source 10 transmits high voltage power through a high-voltage power transmission line 40 to the substation 20. The high-voltage power source 10 is, for example, a power plant.

The substation 20 converts the high-voltage power transmitted through the high-voltage transmission line 40 so as to transmit alternating-current power thus transformed through power transmission lines 50 (power transmission lines 50A to 50C) to the customers 30. The substation 20 will be described later in detail (see FIG. 2).

Each customer 30 has a power generation device, such as a solar power generation device, a fuel cell power generation device, or a wind power generation device, as a power supply device. Each customer 80 has power consumption devices, such as home electric appliances which consume electric power when operating. The customer 30 will be described later in so detail (see FIGS. 3 and 4).

Here, the customers 30 are classified into a plurality of districts based on geographical areas, power companies, and the like. For example, the customers 30A to 30C are connected to the power transmission line 50A, and are classified into a district A. Similarly, the customers 30P to 30R are connected to the transmission line 50B, and are classified into a district B. The customers 30X to 30Z are connected to the transmission line 50C, and are classified into a district C.

The above-described substation 20 controls transmission of alternating-current power for each power transmission line 50. In other words, the substation 20 manages the customers 30 for each district. A unit that the substation 20 manages each customer 30 is referred to as a power distribution system (bank) in the following description.

Specifically, the substation 20 manages the customers 30 in the district A as a bank A. Similarly, the substation 20 manages the customers 30 in the district B as a bank B and the customers 30 in the district C as a bank C.

(Configuration of the Substation)

Figure 2:
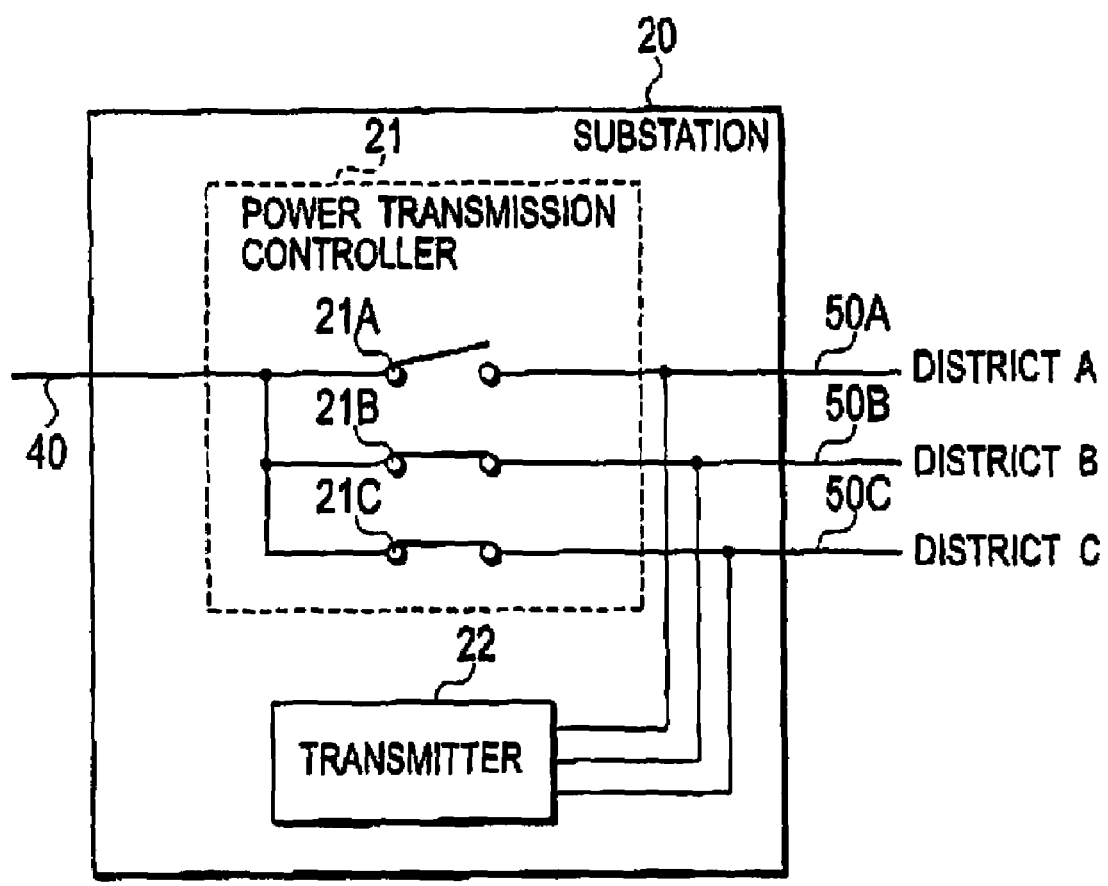
FIG. 2 is a block diagram showing the configuration of a substation 20 according to the first embodiment.

The configuration of the substation according to the first embodiment will be described below by referring to the drawings. FIG. 2 is a block diagram showing the configuration of the substation 20 according to the first embodiment.

As shown in FIG. 2, the substation 20 has a power transmission controller 21 and a transmitter 22.

The power transmission controller 21 has a plurality of relays 21A to 21C. Each relay switches whether to transmit alternating-current power, which is generated by stepping down high-voltage power using a transformer (not shown), to the corresponding bank. Specifically, the relay 21A switches whether to transmit alternating-current power to the customers 30 in the district A. Similarly, the relay 21B switches whether to transmit alternating-current power to the customers 30 in the district B and the relay 21C switches whether to transmit alternating-current power to the customers 30 in the district C.

For example, when a power failure occurs due to natural disasters or the like, the power transmission controller 21 switches the relays to stop transmission of alternating-current power to the respective banks. In contrast, when the power failure is restored, the power transmission controller 21 switches the relays to start the transmission of alternating-current power to the respective banks.

The transmitter 22 transmits, to the customers 30, information to notify the customers 30 that transmission of alternating-current power is to be stopped or started. Specifically, when a power failure occurs due to natural disasters or the like, the transmitter 22 transmits, to the customers 30, information (a grid interconnection stop instruction) to notify the customers 30 that transmission of alternating-current power is to be stopped. On the other hand, when the power failure is restored, the transmitter 22 transmits, to the customers 30, information (a grid interconnection start instruction) to notify the customers 30 that transmission of alternating-current power is to be started.

The transmitter 22 transmits the information, such as the grid interconnection stop instruction and the grid interconnection start instruction, to the customers 80 by using the power transmission lines 50. In addition, the transmitter 22 also transmits the information, such as the grid interconnection stop instruction and the grid interconnection start instruction, to the customers 80 by using a transmission path different from the power transmission lines 50. For example, the transmitter 22 transmits the information, such as the grid interconnection stop instruction and the grid interconnection start instruction, to the customers 30 by using a data delivery area which is provided separately from a content delivery area in digital terrestrial broadcasting.

The grid interconnection stop instruction includes area information specifying an area where grid interconnection between a bank and a power generation device should be stopped. Similarly, the grid interconnection start instruction includes area information specifying an area where grid interconnection between a bank and as power generation device should be started. Here, the area information may be information specifying a bank (district). Alternatively, the area information may be information specifying an area larger than the bank (district) or information specifying an area smaller than the bank (district). For example, the area information may be information specifying an area divided on a municipality basis or hierarchized information based on a size of the area.

As described above, the substation 20 is transmission device configured to transmit the grid interconnection start instruction to each of the customers 30 through the predetermined transmission path. Note that, the transmission device is not limited to the substation 20. Moreover, the grid interconnection system provided with the transmission device is a power control system.

(Configuration on the Customer)

Figure 3:
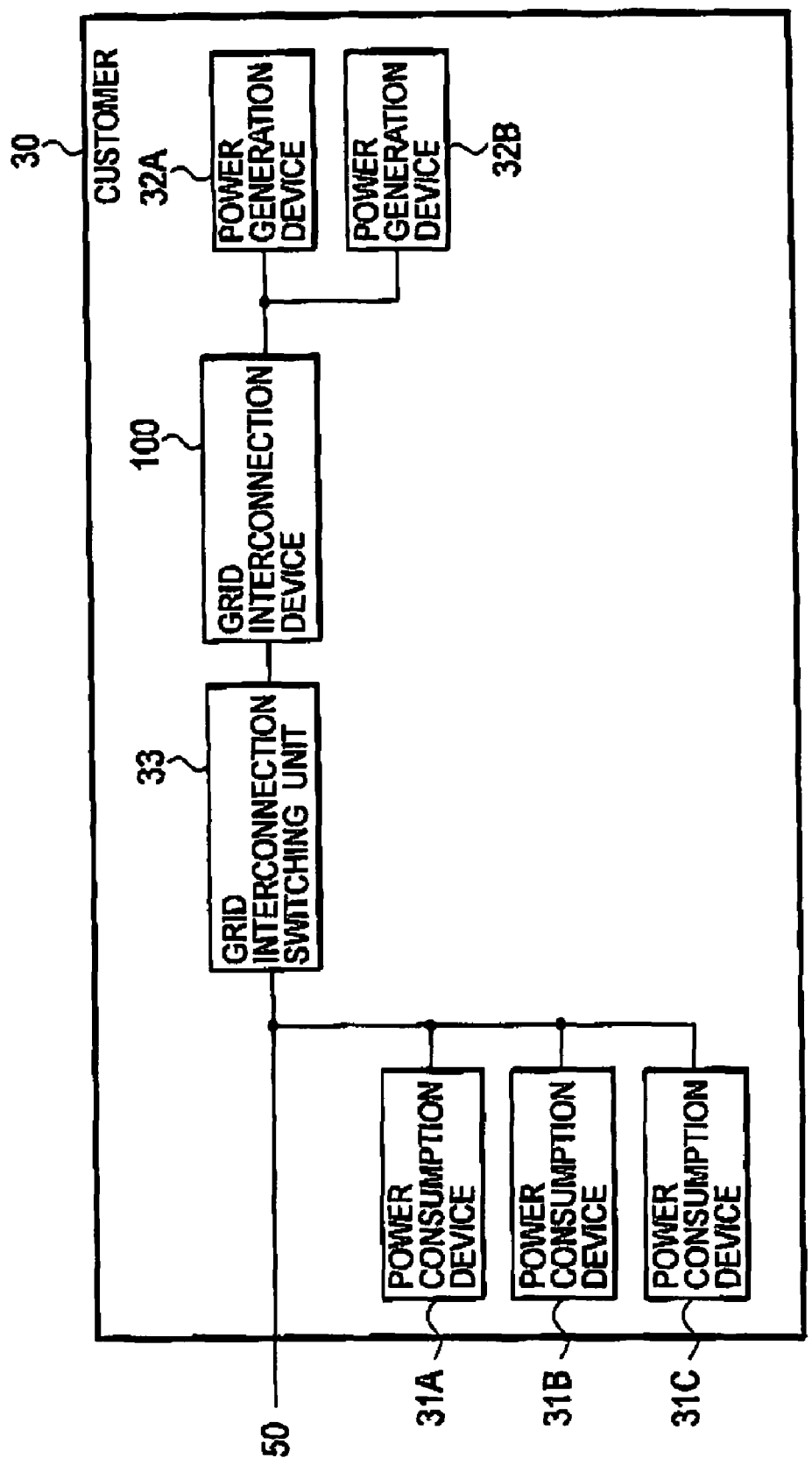
FIG. 3 is a block diagram showing the configuration of a customer 30 according to the first embodiment.

The configuration on the customer side according to the first embodiment will be described by referring to the drawings. FIG. 3 is a block diagram showing the configuration of the customer 80 according to the first embodiment.

As shown in FIG. 3, the customer 30 has a plurality of power consumption devices 31 (power consumption devices 31A to 31C), a plurality of power generation devices 32 (power generation devices 32A and 32B), a grid interconnection switching unit 331 and a grid interconnection device 100. Note that the power generation devices 32 and the grid interconnection device 100 configure a grid interconnection system.

The power consumption devices 31 include, for example, home electric appliances which operate while consuming alternating-current power to be transmitted through the bank (power transmission line 50), electric power generated by the power generation devices 32, or the like.

The power generation devices 32 include power generation devices, such as a solar power generation device, a fuel cell power generation device, a wind power generation device, and the like. The power generation device 32 can generate electric power without using alternating-current power to be transmitted through the bank (power transmission line 50).

The grid interconnection switching unit 33 switches, in response to an instruction from the grid interconnection device 100, whether the bank (power transmission line 50) and the power generation devices 32 are interconnected or separated.

Here, in a state where the bank and the power generation devices 32 are interconnected, electric power generated by the power generation devices 32 is not only consumed by its own customer 30 but also transmitted to other customers 80 through the power transmission line 50. In contrast, in a state where the bank and the power generation devices 32 are separated, electric power generated by the power generation devices 32 is not transmitted to the other customers 30 through the power transmission line 50.

Figure 4:
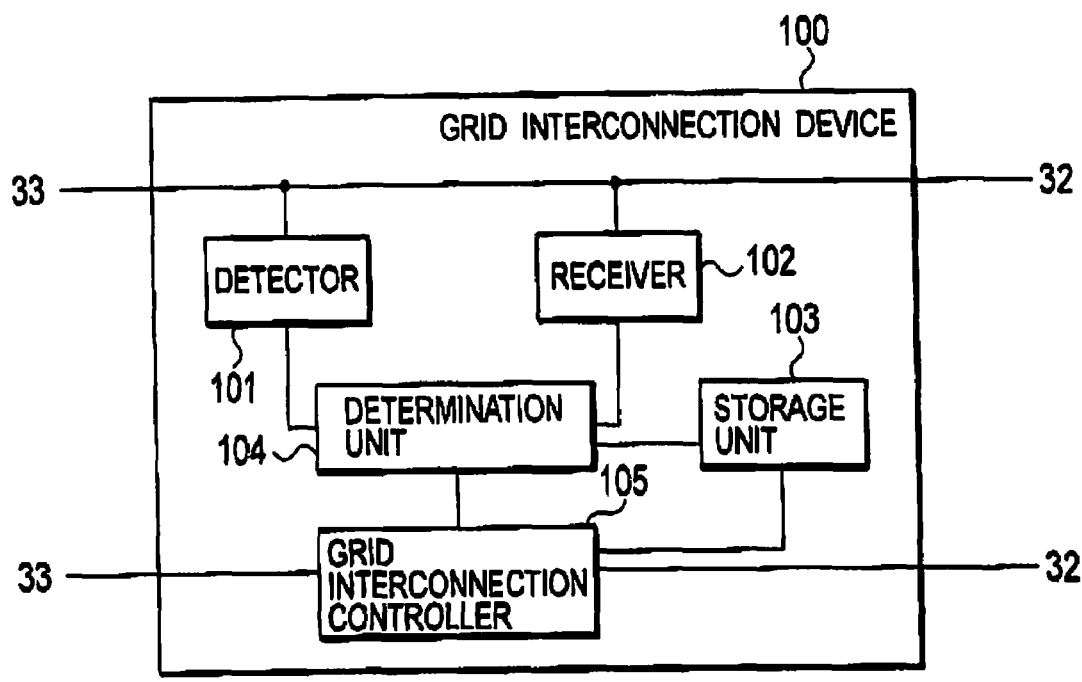
FIG. 4 is a block diagram showing the configuration of a grid interconnection device 100 according to the first embodiment.

The grid interconnection device 100 controls grid interconnection between the bank (power transmission line 60) and the power generation devices 32 depending on whether or not alternating-current power is being transmitted through the power transmission line 50. Specifically, as shown in FIG. 4, the grid interconnection device 100 includes a detector 101, a receiver 102, a storage unit 108, a determination unit 104, and a grid interconnection controller 105.

The detector 101 monitors a state of alternating-current power transmitted through the bank (power transmission line 50). In addition, the detector 101 detects, based on the state of alternating-current power, whether or not alternating-current power is being transmitted through the bank.

The detector 101 monitors, for example, a voltage, a phase difference between voltage and current, a frequency, a change in voltage, a change in phase of voltage, and a change in frequency with regard to alternating-current power transmitted through the bank. Then, the detector 101 detects whether or not alternating-current power is being transmitted through the bank based on data such as the voltage, the phase difference between voltage and current, the frequency, the change in voltage, the change in phase of voltage, and the change in frequency thus obtained. For example, the detector 101 determines that transmission of alternating-current power is started when the voltage, the phase difference between voltage and current, the frequency, the change in voltage, the change in phase of voltage, the change in frequency, and the like is within a tolerance of commercial power.

Specifically, with regard to a "voltage", the detector 101 determines that transmission of alternating-current power is started, when the voltage of alternating-current power thus obtained is within a predetermined range for standard voltages (AC 100V, AC 200V).

With regard to a "phase difference between voltage and current", the detector 101 determines that transmission of alternating-current power is started, when the phase difference between voltage and current of alternating-current power thus obtained is within a predetermined range.

With regard to a "frequency", the detector 101 determines that transmission of alternating-current power is started, when the frequency of so alternating-current power thus obtained is within a predetermined range for a standard frequency (60 Hz or 50 Hz, which varies depending on a region) of commercial power.

With regard to a "change in voltage", the detector 101 determines that transmission of alternating-current power is started, when a change amount of voltage of alternating-current power is within a predetermined range.

With regard to a "change in phase of voltage", the detector 101 determines that transmission of alternating-current power is started, when a change amount of phase of voltage of alternating-current power is within a predetermined range.

With regard to a "change in frequency", the detector 101 determines that transmission of alternating-current power is started, when a change amount of frequency of alternating-current power is within a predetermined range.

The receiver 102 receives information for notification of a power failure (a grid interconnection stop instruction) or information for notification of power failure restoration (a grid interconnection start instruction).

Specifically, the receiver 102 receives information, such as a grid interconnection stop instruction or a grid interconnection start instruction, by using the power transmission line 50. In addition, the receiver 102 also receives information, such as the grid interconnection stop instruction or the grid interconnection start instruction, by using a transmission path different from the power transmission line 50. For example, the receiver 102 receives information, such as the grid interconnection stop instruction or the grid interconnection start instruction, by using a data delivery area which is separately provided from a content delivery area in the digital terrestrial broadcasting.

The storage unit 103 stores information specifying an area in which there is its own customer 30 that includes therein this storage unit 103 (own area information). For example, the own area information includes information specifying a district in which there is the own customer 30 (a bank to which the own customer 30 is connected), information specifying an area larger than the district in which there is the own customer 30, or the like.

The storage unit 103 stores information specifying an area adjacent to the area in which there is the own customer 30 (adjacent area information). The adjacent area information includes, for example, information specifying a district adjacent to the district in which there is the own customer 30 (a bank adjacent to the bank to which the own customer 30 is connected), information specifying an area adjacent to the area larger than the district in which there is the own customer 30, or the like.

If it is determined that grid interconnection between the bank and the power generation devices 82 should be started, the storage unit 108 stores the starting order of the grid interconnection of the power generation devices 32. The starting order of the grid interconnection of the power generation devises 32 may start from the power generation device 32 having a larger power generation amount, or may start from the power generation device 32 having a smaller power generation amount. Alternatively, the starting order of the grid interconnection of the power generation devices 32 may start from the power generation device 32 having a smaller environmental burden (for example, emission of $CO_2$). It is preferable that the starting order of the grid interconnection of the power generation devices 32 be set so as to keep a balance between a loading state of the power consumption devices 31 and a power generation amount of the power generation devices 32, the power consumption devices 31 and the power generation devices 32 being provided to their own customer 30.

The determination unit 104 is configured to determine, when the bank (power transmission line 50) and the power generation devices 32 should be separated or interconnected based on the result detected by the detector 101 and the information received by the receiver 102.

Specifically, the determination unit 104 determines that the grid interconnection between the bank and the power generation devices 32 should be stopped, in other words, determines that the bank and the power generation devices 32 should be separated, when the receiver 102 receives the grid interconnection stop instruction including its own area information after the detector 101 detects that the transmission of alternating-current power is stopped.

On the other hand, the determination unit 104 determines that the grid interconnection between the bank and the power generation devices 32 should be started, in other words, determines that the bank and the power generation devices 32 should be interconnected, when the receiver 102 receives the grid interconnection start instruction including the own area information after the detector 101 detects that the transmission of alternating-current power is started.

The determination unit 104 determines that the grid interconnection between the bank and the power generation devices 32 should be prepared, when the receiver 102 receives the grid interconnection start instruction including adjacent area information. Here, the power generation devices 32 to be prepared for grid interconnection include a fuel cell system, a micro gas turbine, an engine generator, and the like, which takes a time to prepare for grid interconnection.

The grid interconnection controller 105 controls the grid interconnection between the bank and the power generation devices 32 based on the result determined by the determination unit 104. Specifically, the grid interconnection controller 105 instructs the grid interconnection switching unit 33 to separate the bank and the power generation devices 32, when it is determined that the grid interconnection between the bank and the power generation devices 32 should be stopped.

On the other hand, the grid interconnection controller 105 instructs the grid interconnection switching unit 33 to start the grid interconnection between the bank and the power generation devices 32, when it is determined that the grid interconnection between the bank and the power generation devices 32 should be started. Here, the grid interconnection controller 105 instructs the power generation devices 32 to start the grid interconnection of the power generation devices 32 according to the order stored in the storage unit 103.

The grid interconnection controller 105 instructs the power generation devices 32 to prepare for grid interconnection of the power generation devices 32, when it is determined that the grid interconnection between the bank and the power generation devices 32 should be prepared.

In addition, the grid interconnection controller 105 performs control such that electric power generated by the power generation device 32 would be synchronized with alternating-current power of the bank. Specifically, when the power generation device 32 is a direct-current power source (for example, a solar power generation system or a fuel cell system), the grid interconnection controller 105 firstly steps up direct-current power generated by the power generation device 32 using a voltage boost circuit, and thereafter converts the direct-current power to alternating-current power using an inverter circuit in order to synchronize the alternating-current power thus converted with the alternating-current power of the bank. On the other hand, when the power generation device 32 is an alternating-current power source (for example, a wind power generation system), the grid interconnection controller 105 firstly converts alternating-current power generated by the power generation device 32 to a direct-current power using a rectifier circuit, and thereafter converts the direct-current power to alternating-current power using an inverter circuit in order to synchronize the alternating-current power thus converted with the alternating-current power of the bank. Alternatively, the grid interconnection controller 105 directly converts alternating-current power generated by the power generation device 32 to alternating-current power using a matrix converter circuit, a cycloconverter circuit, or the like, in order to synchronize the alternating-current power thus converted with the alternating-current power of the bank.

(Operations of the Grid Interconnection Device)

Figure 5:
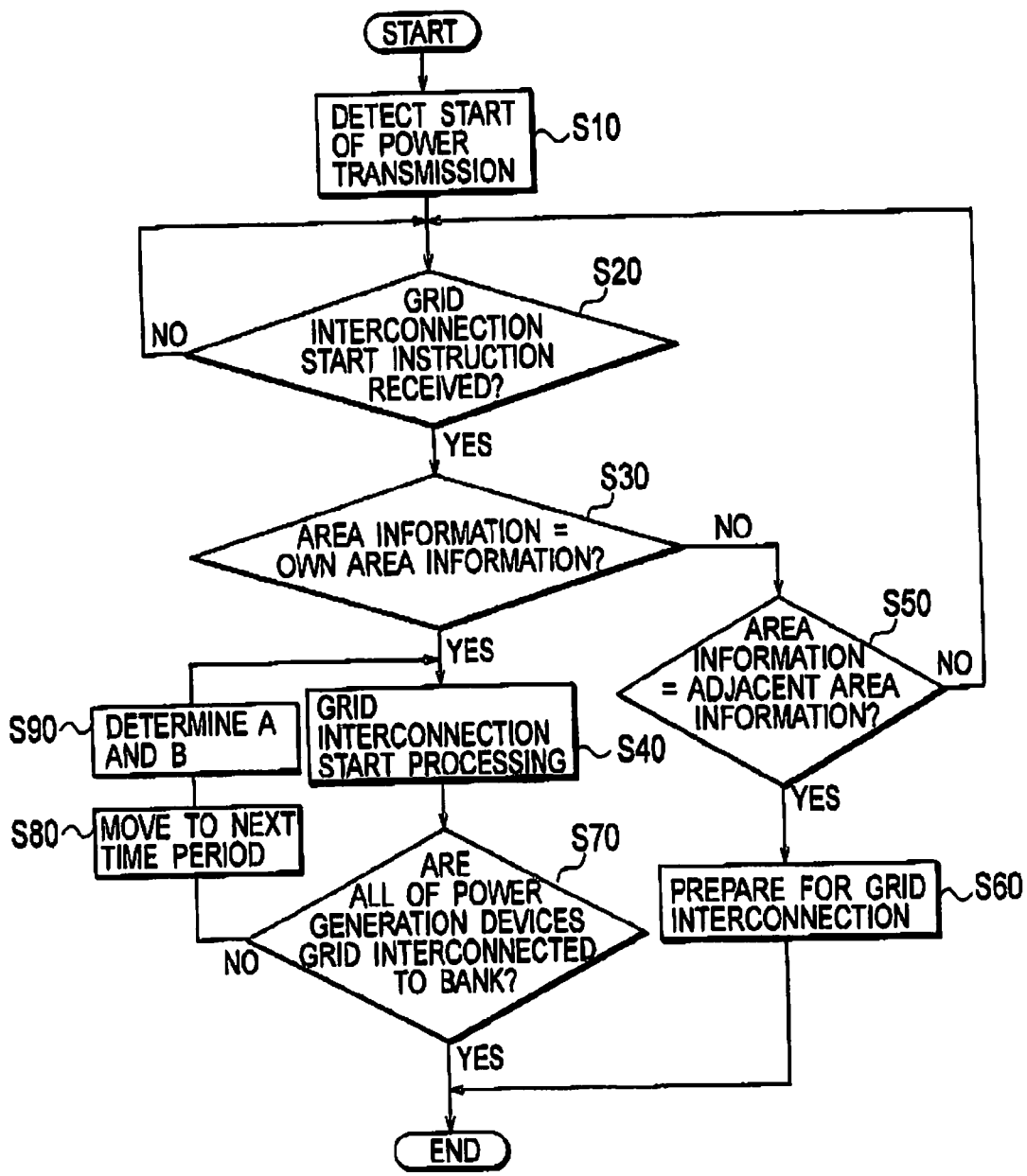
FIG. 5 is a flowchart showing operations of the grid interconnection device 100 according to the first embodiment.

Operations of the grid interconnection device according to the first embodiment will be described below by referring to the drawings. FIG. 5 is a flowchart showing the operations of the grid interconnection device 100 according to the first embodiment. Note that, in FIG. 5, the description will be given of the operations of the grid interconnection device 100 in a case where the grid interconnection between the bank and the power generation devices 32 is started.

As shown in FIG. 5, at step S10, the grid interconnection device 100 detects the start of transmission of alternating-current power based on a state of alternating-current power transmitted through the bank (power transmission line 50).

At step S20, the grid interconnection device 100 determines whether or not the grid interconnection device 100 has received a grid interconnection start instruction. Subsequently, the grid interconnection device 100 proceeds to processing at step S30 upon receipt of the grid interconnection start instruction. On the other hand, the grid interconnection device 100 waits for receiving the grid interconnection start instruction until the grid so interconnection device 100 receives this instruction.

At step S30, the grid interconnection device 100 determines whether or not the area information included in the grid interconnection start instruction includes its own area information. If the area information included in the grid interconnection start instruction includes the own area information, the grid interconnection device 100 proceeds to processing at step S40. If the area information included in the grid interconnection start instruction does not include the own area information, the grid interconnection device 100 proceeds to processing at step S50.

At step S40, the grid interconnection device 100 starts grid interconnection between the bank and the power generation devices 32 (grid interconnection start processing). Here, the grid interconnection device 100 starts the grid interconnection of the power generation devices 32 according to the order stored in the storage unit 103. The grid interconnection start processing will be described later in detail (see FIGS. 10 and 12).

At step S50, the grid interconnection device 100 determines whether or not the area information included in the grid interconnection start instruction includes adjacent area information. If the area information included in the grid interconnection start instruction includes the adjacent area information, the grid interconnection device 100 proceeds to processing at step S60. If the area information included in the grid interconnection start instruction does not include the adjacent area information, the grid interconnection device 100 returns to the processing at step S20.

At step S60, the grid interconnection device 100 prepares for grid interconnection between the bank and the power generation devices 32. Specifically, the grid interconnection device 100 prepares for starting the grid interconnection of the power generation devices 32.

Incidentally, the grid interconnection device 100 may send an error message to the substation 20, when the grid interconnection device 100 keeps waiting for receiving the grid interconnection start instruction for more than a certain period at step S20.

At step S70, the grid interconnection device 100 determines whether or not all of the power generation devices 32 are interconnected to the bank. If all of the power generation devices 32 are interconnected to the bank, the grid interconnection device 100 terminates a series of processing. If all of the power generation devices 32 are not interconnected to the bank, the grid interconnection device 100 proceeds to processing at step S80.

At step S80, the grid interconnection device 100 moves to the next time period. Subsequently, at step S90, the grid interconnection device 100 acquires a load (A) of the power consumption devices 31 and a power generation amount (B) of the power generation devices 82, corresponding to the current time period.

Here, when the customer 30 or the like makes a contract with a power company, the types of power consumption devices 31 and a contracted power amount are presented to the power company. When the customer 30 or the like introduces a power generation device 32, the type and power generation capacity of the introduced power generation device 32 are presented to the power company.

Accordingly, it should be noted that the grid interconnection device 100 can acquire the load (A) of the power consumption devices 31 and the power generation amount (B) of the power generation devices 32, for each time period based on information presented to the power company. In other words, the load (A) of the power consumption devices 31 and the power generation amount (B) of the power generation devices 32 are the information that is already known to or can be estimated by the grid interconnection device 100.

Thus, the load (A) of the power consumption devices 31 and the power generation amount (B) of the power generation devices 32 may be the load of the power consumption devices 31 and the power generation amount of the power generation devices 32, the power consumption devices 31 and the power generation devices 32 being provided to the customer 30 having the grid interconnection device 100. Alternatively, the load (A) of the power consumption devices 31 and the power generation amount of the power generation devices 32 may also be the load of the power consumption devices 31 and the power generation amount of the power generation devices 32, the power consumption devices 31 and the power generation devices 32 being connected to the bank including the grid interconnection device 100.

(Operations and Effects)

In the grid interconnection device 100 according to the first embodiment, the grid interconnection controller 105 starts grid interconnection between the power transmission line 60 (bank) and the power generation devices 32 upon receipt of a grid interconnection start so instruction in a state where transmission of alternating-current power is started through the power transmission line 50 (bank). Accordingly, it is prevented that the customer 80 starts grid interconnection of the power generation devices 32 as needed, so that an excessive load is applied on the power transmission line 50.

Thus, in a case where transmission of alternating-current power from the substation 20 is restored, the grid interconnection between the power transmission line 50 (bank) and the power generation devices 32 can be started, while an excessive load is prevented from being applied on the power transmission line.

In the grid interconnection device 100 according to the first embodiment, the grid interconnection controller 105 prepares for grid interconnection between the power transmission line 50 (bank) and the power generation devices 32, when the area information included in the grid interconnection start instruction includes adjacent area information. In general, when the grid interconnection between the bank and the power generation devices 32 becomes possible in the adjacent area, it is highly likely that the grid interconnection between the bank and the power generation devices 32 also becomes possible in the own area. In such a case, the grid interconnection device 100 can start the grid interconnection between the bank and the power generation devices 32 quickly by preparing for the grid interconnection between the bank and the power generation devices 32 in advance.

Second Embodiment

A second embodiment of the present invention will be described below by referring to the drawings. In the following description, differences between the above-described first embodiment and the second embodiment will be mainly described.

Specifically, in the above-described first embodiment, the customer 30 has power generation devices, such as a solar power generation device, a fuel cell power generation device, a wind power generation device, and the like, as power supply devices. In contrast, in the second embodiment, a customer 80 has electric storage devices, such as a secondary battery, a flywheel electricity storage device, an electric double layer capacitor, and the like, as power supply devices.

(Configuration on the Customer Side)

Figure 6:
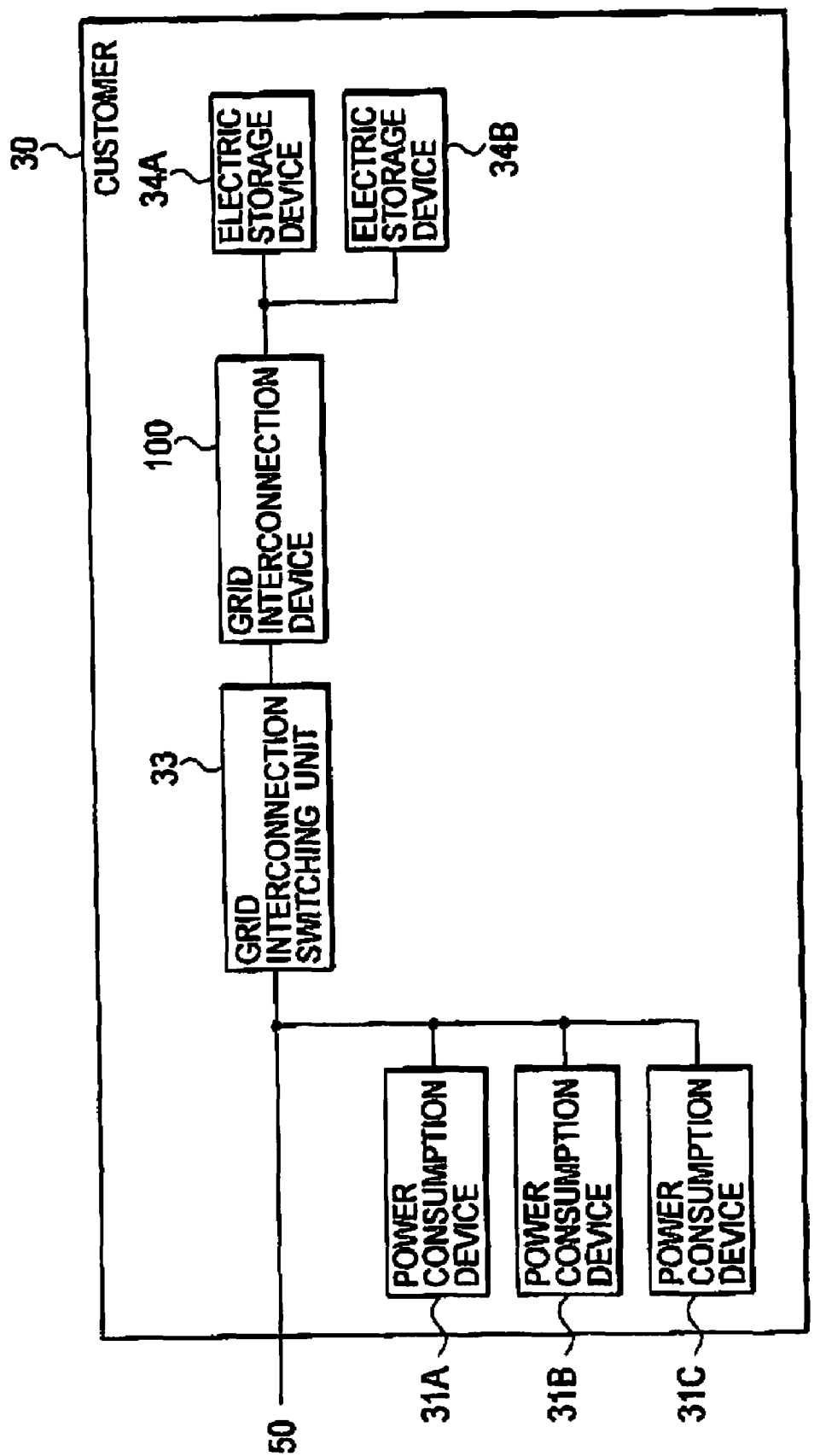
FIG. 6 is a block diagram showing the configuration of a customer 30 according to a second embodiment.

The configuration on the customer side according to the second embodiment will be described below by referring to the drawings. FIG. 6 is a block diagram showing the configuration of the customer 30 according to the second embodiment.

As shown in FIG. 6, the customer 30 has a plurality of power consumption devices 31 (power consumption devices 31A to 31C), a plurality of electric storage devices 34 (electric storage devices 34A and 34B), a grid interconnection switching unit 33, and a grid interconnection device 100. Note that the electric storage devices 34 and the grid interconnection device 100 configure a grid interconnection system.

The power consumption devices 31 include home electric appliances which operate while consuming alternating-current power transmitted through a bank (power transmission line 50), electric power supplied by the electric storage devices 34, or the like.

The electric storage devices 34 are energy storage devices, such as a secondary battery, a flywheel electricity storage device, an electric double layer capacitor, and the like. The electric storage devices 34 charge alternating-current power transmitted through the bank (power transmission line 50) and the like, and can supply electric power to the plurality of power consumption devices 31 or transmit power to other customers 30.

Specifically, the electric storage devices 34 charge alternating-current power transmitted through the bank (power transmission line 50), when the power consumption of the plurality of power consumption devices 31 is low. In contrast, when the power consumption of the plurality of power consumption devices 31 is high, the electric storage devices 34 supply power to the plurality of power consumption devices 31 prior to transmitting power to other customers 30.

In addition, when electricity rates are set depending on season, time of day, and the like, the electric storage devices 34 charge alternating-current power transmitted through the bank (power transmission line 50) in the season or time of day when the electricity rate is cheap. In contrast, the electric storage devices 34 places priority on supplying power to the plurality of power consumption devices 31 and on transmitting power to other customers 30 in the season or time of day when the electricity rate is expensive.

The grid interconnection switching unit 33 switches, in response to an instruction from the grid interconnection device 100, whether the bank (power transmission line 50) and the electric storage devices 34 are interconnected or separated.

Here, in a state where the bank and the electric storage devices 34 are interconnected, electric power supplied by the electric storage devices 34 is not only consumed by its own customer 30 but also transmitted to other customers 30 through the power transmission line 50. In contrast, in a state where the bank and the electric storage devices 34 are separated, electric power supplied by the electric storage devices 34 is not transmitted to other customers 30 through the power transmission line 50.

The grid interconnection device 100 controls grid interconnection between the bank (power transmission line 50) and the electric storage devices 34 depending on whether or not alternating-current power is being transmitted through the power transmission line 50.

Third Embodiment

A third embodiment will be described below by referring to the drawings. The third embodiment is a combination of the above-described first and second embodiments. Specifically, in the third embodiment, a customer 30 has a power generation device 32 and an electric storage device 34 as power supply devices.

(Configuration on the Customer Side)

Figure 7:
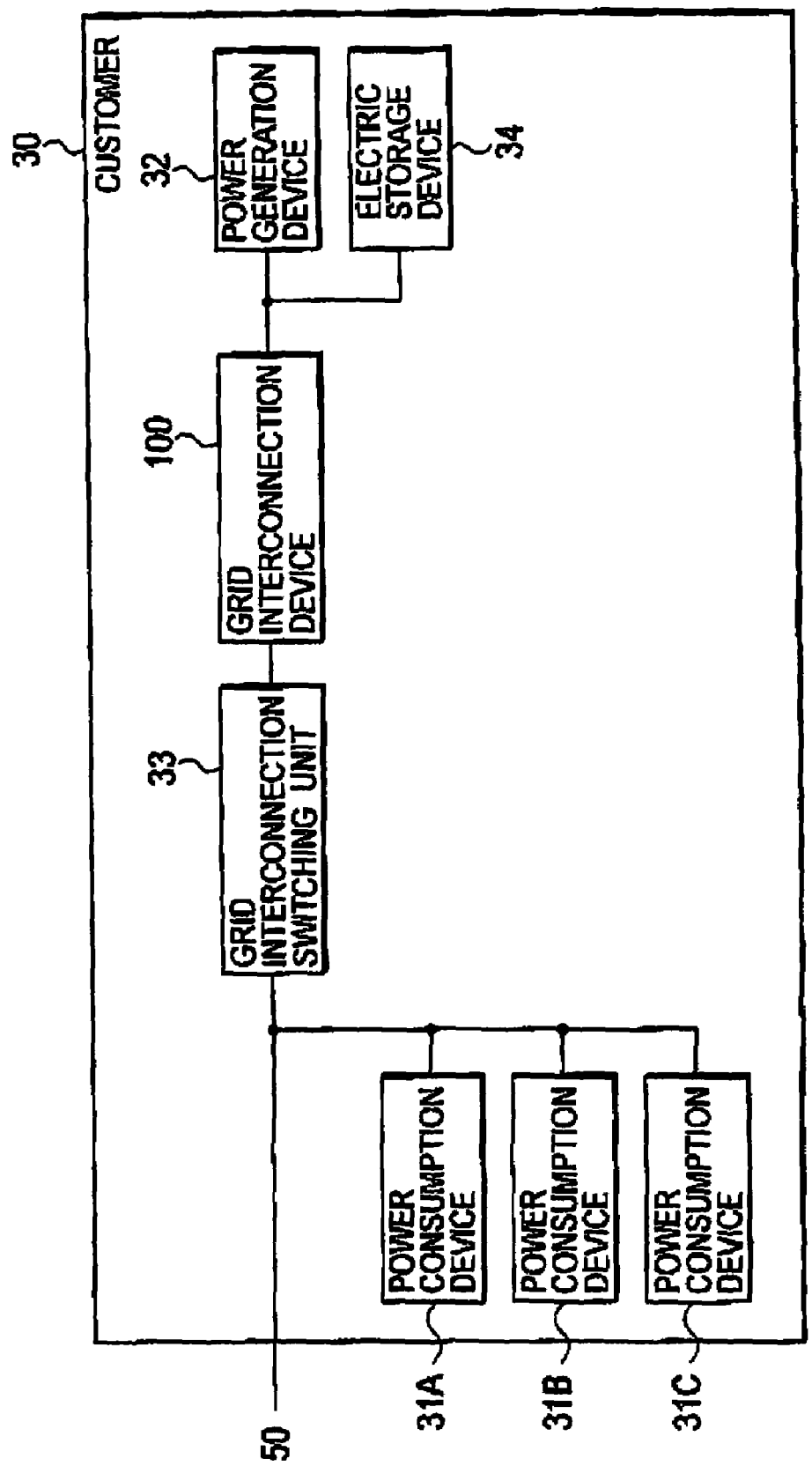
FIG. 7 is a block diagram showing the configuration of a customer 30 according to a third embodiment.

The configuration on the customer side according to the third embodiment will be described by referring to the drawings. FIG. 7 is a block diagram showing the configuration of a customer 30 according to the third embodiment.

As shown in FIG. 7, the customer 30 has a plurality of power consumption devices 31 (power consumption devices 31A to 31C), the power generation device 32, the electric storage device 34, a grid interconnection switching unit 33, and a grid interconnection device 100. Note that the power generation device 82, the electric storage device 34 and the grid interconnection device 100 configure a grid interconnection system.

The power consumption devices 31, the grid interconnection switching unit 33 and the grid interconnection device 100 according to the third embodiment are similar to those described in the first and second embodiments. Accordingly, the description thereof will be omitted as appropriate.

The power generation device 32 and the electric storage device 34 are connected to the grid interconnection device 100 in parallel.

As similar to the above-described first embodiment, the power generation device 32 is a power generation device, such as a solar power generation device, a fuel cell power generation device, a wind power generation device, or the like. The power generation device 32 can generate electric power without using alternating-current power transmitted through a bank (power transmission line 50).

As similar to the above-described second embodiment, the electric storage device 34 is an energy storage device, such as a secondary battery, a flywheel electricity storage device, an electric double layer capacitor, or the like. The electric storage device 34 charges alternating-current power through the bank (power transmission line 50), and can supply electric power to the plurality of power consumption devices 81 and transmit power to other customers 30.

Fourth Embodiment

A fourth embodiment will be described below by referring to the drawings. In the following description, differences between the third and fourth embodiments will be mainly described.

Specifically, in the above-described third embodiment, the power generation device 32 and the electric storage device 34 are connected to the grid interconnection device 100 in parallel. In contrast, in the fourth embodiment, a power generation device 82 and an electric storage device 34 are connected to a grid interconnection device 100 in series, (Configuration on a Customer Side)

Figure 8:
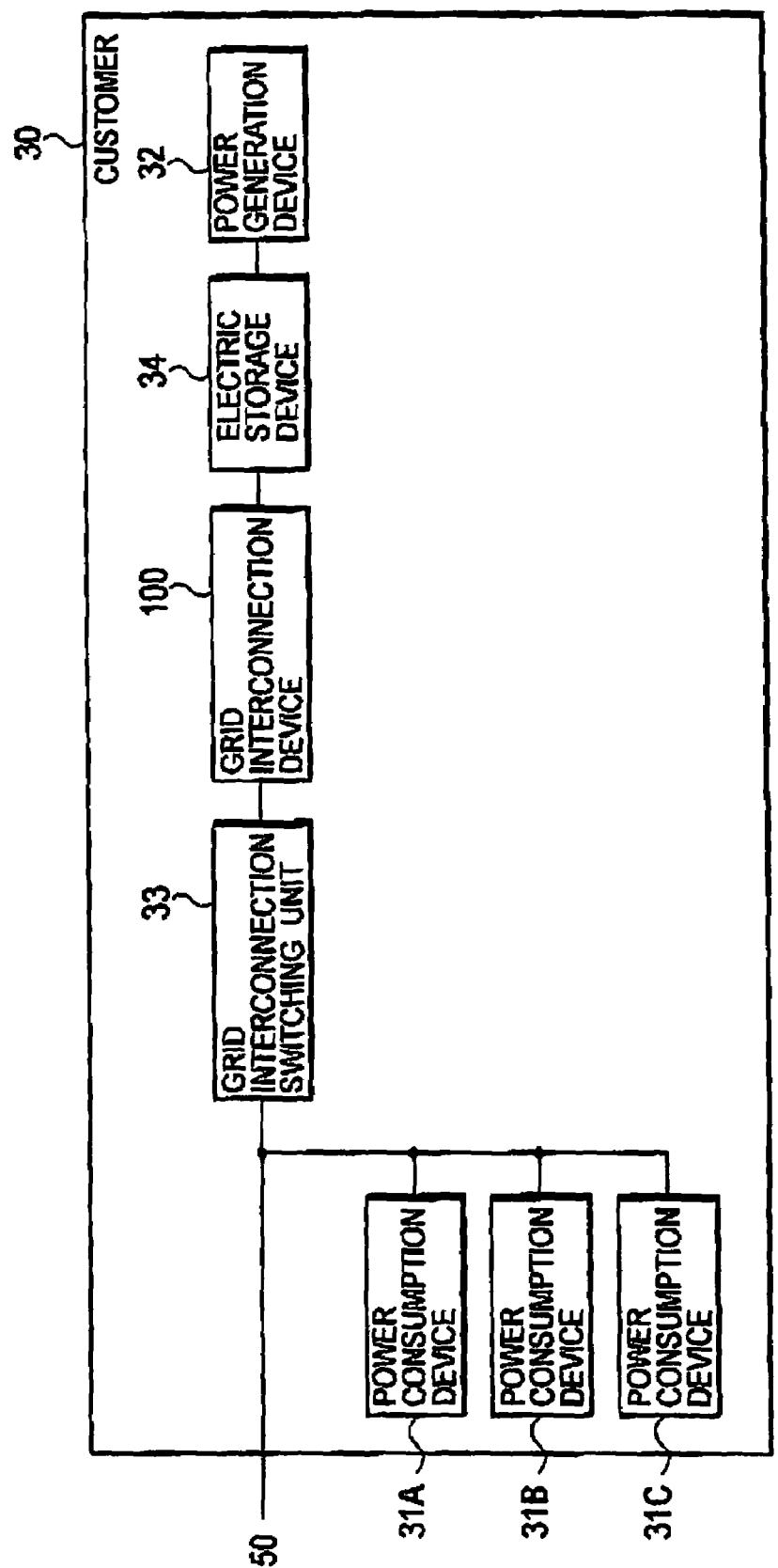
FIG. 8 is a block diagram showing the configuration of a customer 30 according to a fourth embodiment.

The configuration on a customer side according to the fourth embodiment will be described below by referring to the drawings. FIG. 8 is a block diagram showing the configuration of a customer 30 according to the fourth embodiment.

As shown in FIG. 8, the customer 30 has a plurality of power consumption devices 31 (power consumption devices 31A to 31C), the power generation device 32, the electric storage device 84, a grid interconnection switching unit 33, and the grid interconnection device 100. Note that the power generation device 32, the electric storage device 34, and the grid interconnection device 100 configure a grid interconnection system.

The power consumption devices 31, the grid interconnection switching unit 33 and the grid interconnection device 100 are similar to those described in the first and second embodiments. Accordingly, the description thereof will be omitted as appropriate.

The power generation device 32 and the electric storage device 34 are connected to the grid interconnection device 100 in series. Specifically, the electric storage device 34 is connected to the grid interconnection device 100, and the power generation device 32 is connected to the electric storage device 34.

As similar to the above-described first embodiment, the power generation device 32 is a power generation device, such as a solar power generation device, a fuel cell power generation device, a wind power generation device, or the like. The power generation device 32 can generate electric power without using alternating-current power transmitted through a bank (power transmission line 50).

As similar to the above-described second embodiment, the electric storage device 34 is an energy storage device, such as a secondary battery, a flywheel electricity storage device, an electric double layer capacitor, or the like. The electric storage device 34 charges alternating-current power transmitted through the bank (power transmission line 50), and can supply electric power to the plurality of power consumption devices 31 or transmit power to other customers 30.

Here, when the power generation device 32 is a solar power generation device, a wind power generation device, or the like, electric power to be supplied to the plurality of consumption devices 31 and electric power to be transmitted to other customers 30 has to be equalized since electric power generated by the power generation device 32 varies according to weather conditions and the like. For this reason, in the fourth embodiment, the electric storage device 34 charges electric power generated by the power generation device 32 so that electric power to be supplied to the plurality of power consumption devices 31 or electric power to be transmitted to other customers 30 can be equalized.

Fifth Embodiment

A fifth embodiment will be described below by referring to the drawings. In the following description, differences between the above-described first to fourth embodiments and the fifth embodiment will be mainly described.

Specifically, although it is not described in the above-described first to fourth embodiments, in the fifth embodiment, the description will be given of the operations of a grid interconnection device 100 which starts grid interconnection between a bank and a power supply device (a power generation device 32 or an electric storage device 34) using an example where a customer 30 is a plant.

(Start of Grid Interconnection of the Power Supply Device)

Figure 9:
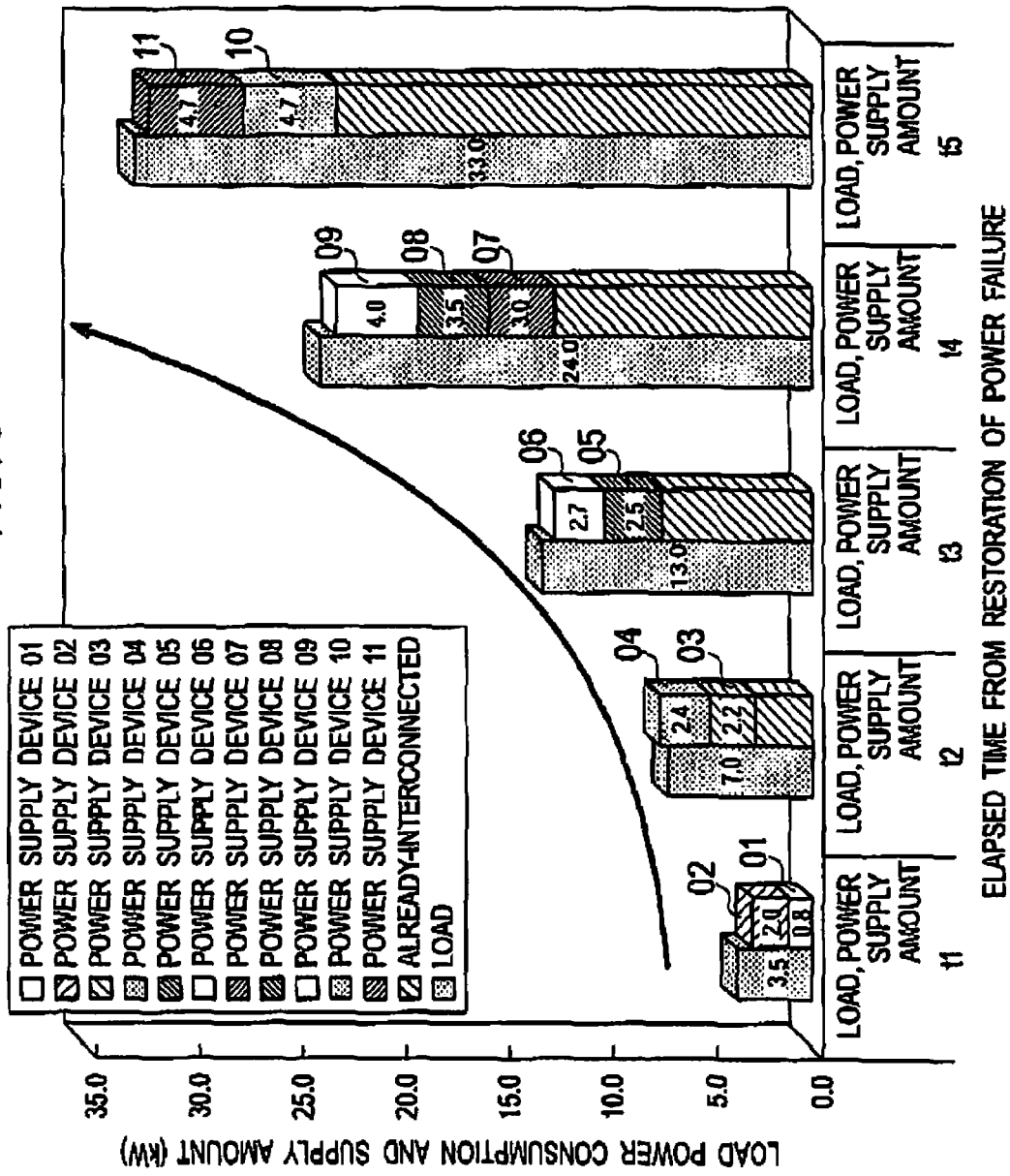
FIG. 9 is a graph for illustrating the start of grid interconnection of a power supply device according to a fifth embodiment.

Start of grid interconnection of the power supply device according to the fifth embodiment will be described below by referring to the drawings. FIG. 9 is a graph for illustrating the start of grid interconnection of the power supply device according to the fifth embodiment.

As shown in FIG. 9, when the customer 30 is a plant, an increasing amount of a load (power consumption) of power consumption devices 31 provided in the plant is small immediately after a power failure is restored, and gradually becomes larger with elapse of time. This is because the to power consumption devices 31 provided in the plant are machine tools and the like, and thus full-scale operation of the machine tools is performed after processes such as checkouts, automatic startup sequences, and the like of the machine tools are carried out.

Accordingly, grid interconnection of the power supply devices is is started from the power supply device having a smaller power supply amount so that balance between the load (power consumption) of the power consumption devices 31 and the power supply amount of the power supply devices can be kept. Thereby, it becomes less likely that a power amount to be transmitted to the bank (power transmission line 50) temporarily becomes excessively large.

Note that the power supply amount is the power amount that the power supply devices are capable of supplying. In addition, the power supply amount is determined based on the power generation amount of the power generation devices 32, the electric charge amount of the electric storage devices 34, and the like.

(Operations of the Grid Interconnection Device)

Figure 10:
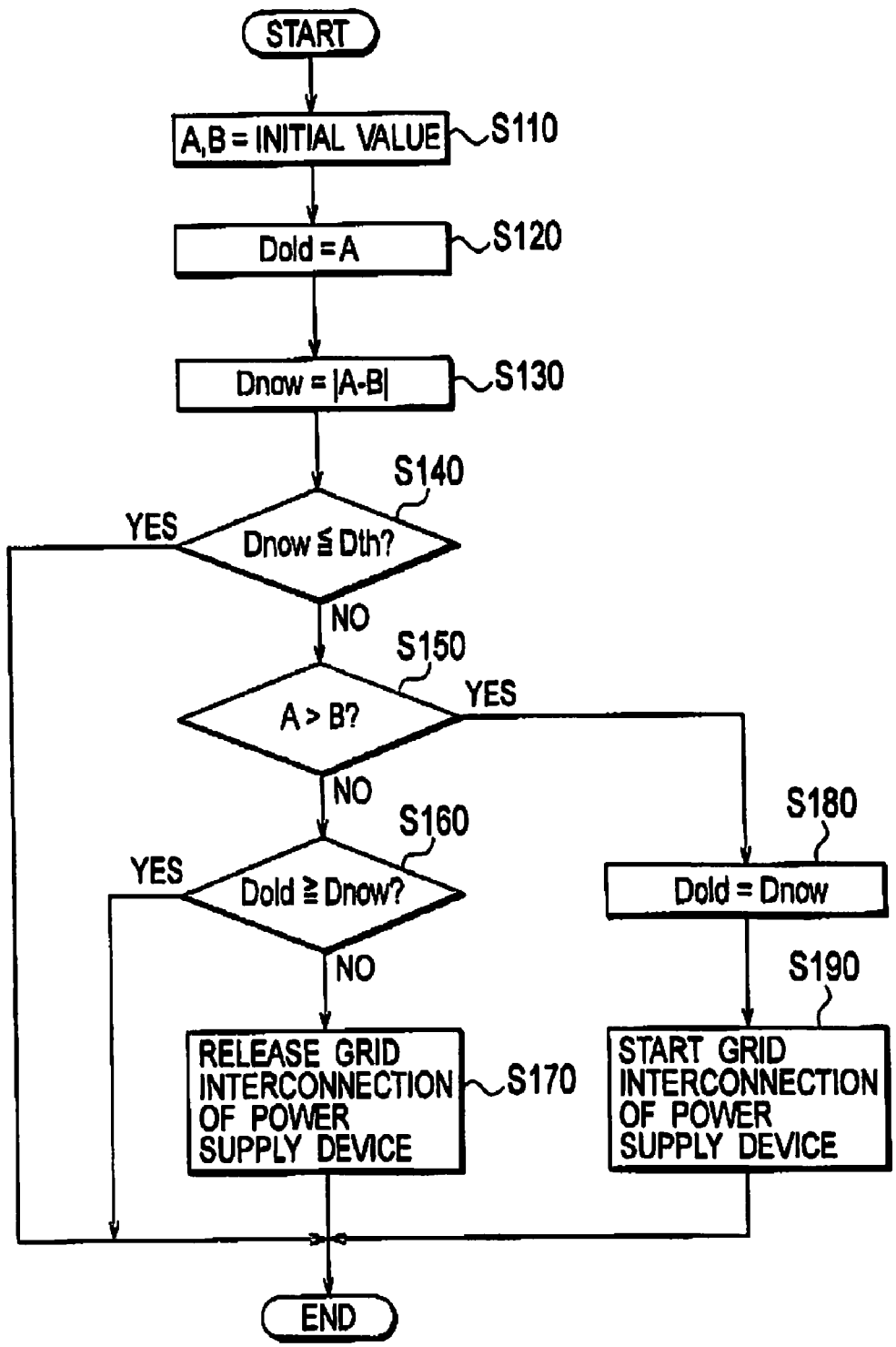
FIG. 10 is a flowchart showing operations of a grid interconnection device 100 according to the fifth embodiment.

Operations of the grid interconnection device according to the fifth embodiment will be described below by referring to the drawings. FIG. 10 is a flowchart showing the operations of the grid interconnection device 100 according to the fifth embodiment. Note that FIG. 10 shows processes carried out at the above-described step S40 in FIG. 5.

As shown in FIG. 10, at step S110, the grid interconnection device 100 sets initial values to a load (A) of the power consumption device 31 and to a power supply amount (B) of the power supply device, respectively. The initial value of the load (A) is the load of the power consumption device 31 from which grid interconnection is firstly started after a power failure is restored. The initial value of the power supply amount (B) is "0".

At step S120, the grid interconnection device 100 sets the load (A) to a difference (Dold) between the load (A) and the power supply amount (B). The difference (Dold) is a difference between the load (A) and the power supply amount (B) before grid interconnection of a new power supply device is started.

Note that when the above-described step S90 in FIG. 5 is carried out, steps S110 and S120 will be omitted.

At step S130, the grid interconnection device 100 sets an absolute value of the difference between the load (A) and the power supply amount (B) to a difference (Dnow) between the load (A) and the power supply amount (B). The difference (Dnow) is a difference between the load (A) and the power supply amount (B) after the grid interconnection of the new power supply device is started. Note that the load (A) and the power supply amount (B) are information acquired at the above-described step S90 in FIG. 5.

At step S140, the grid interconnection device 100 determines whether or not the difference (Dnow) is equal to or less than a threshold value (Dth). If the difference (Dnow) is equal to or less than the threshold value (Dth), the grid interconnection device 100 determines that the balance between the load (A) and the power supply amount (B) is kept, and thus stops a series of processing. In contrast, when the difference (Dnow) is more than the threshold value (Dth), the step proceeds to processing at step S150.

At step S150, the grid interconnection device 100 determines whether or not the load (A) is larger than the power supply amount (B). If the load (A) is larger than the power supply amount (B), the grid interconnection device 100 determines that the power supply amount is deficient, and the step proceeds to processing at step S180. In contrast, when the load (A) is smaller than the power supply amount (B), the grid interconnection device 100 determines that the power supply amount is too so large, and the step proceeds to processing at step S160.

At step S160, the grid interconnection device 100 determines whether or not the difference (Dold) is equal to or more than the difference (Dnow). If the difference (Dold) is equal to or more than the difference (Dnow), the grid interconnection device 100 determines that the balance as between the load (A) and the power supply amount (B) is improved, and thus stops a series of processing. In contrast, when the difference (Dold) is less than the difference (Dnow), the grid interconnection device 100 determines that the balance between the load (A) and the power supply amount (B) is deteriorated, and the step proceeds to processing at step S170.

At step S170, the grid interconnection device 100 releases the grid interconnection of the power supply device which was previously added. In other words, it separates the previously-added power supply device.

At step S180, the grid interconnection device 100 sets the difference (Dnow) to the difference (Dold).

At step S190, the grid interconnection device 100 starts the grid interconnection of the power supply device having the smallest power supply amount among the power supply devices which have not started grid interconnection yet.

As described above, the load (A) and the power supply amount (B) may be the load of the power consumption devices 31 and the power supply amount of the power supply devices, the power consumption devices 31 and the power supply devices being provided to the customer 30 having the grid interconnection device 100. In this case, the order of starting grid interconnection of the power supply devices is determined based on the load of the power consumption devices 31 and the power supply amount of the power supply devices, the power consumption devices 31 and the power supply devices being provided to the customer 30 having the grid interconnection device 100.

On the other hand, as described above, the load (A) and the power supply amount (B) may be the load of the power consumption devices 31 and the power supply amount of the power supply devices, the power consumption devices 31 and the power supply devices being connected to the bank including the grid interconnection device 100. In this case, the order of grid interconnection of the power supply devices is determined based on the load of the power consumption devices 31 and the power supply amount so of the power supply devices, the power consumption devices 31 and the power supply devices being connected to the bank including the grid interconnection device 100.

Sixth Embodiment

A sixth embodiment will be described below by referring to the drawings. In the following description, differences between the above-described first to fourth embodiments and the sixth embodiment will be mainly described.

Specifically, although it is not described in the above-described first to fourth embodiments, in the sixth embodiment, the description will be given of the operations (grid interconnection start processing) of a grid interconnection device 100 starting grid interconnection between a bank and a power supply device (a power generation device 32 or a power supply device 34) using an example where a customer 30 is a general house.

(Start of Grid Interconnection of the Power Supply Device)

Figure 11:
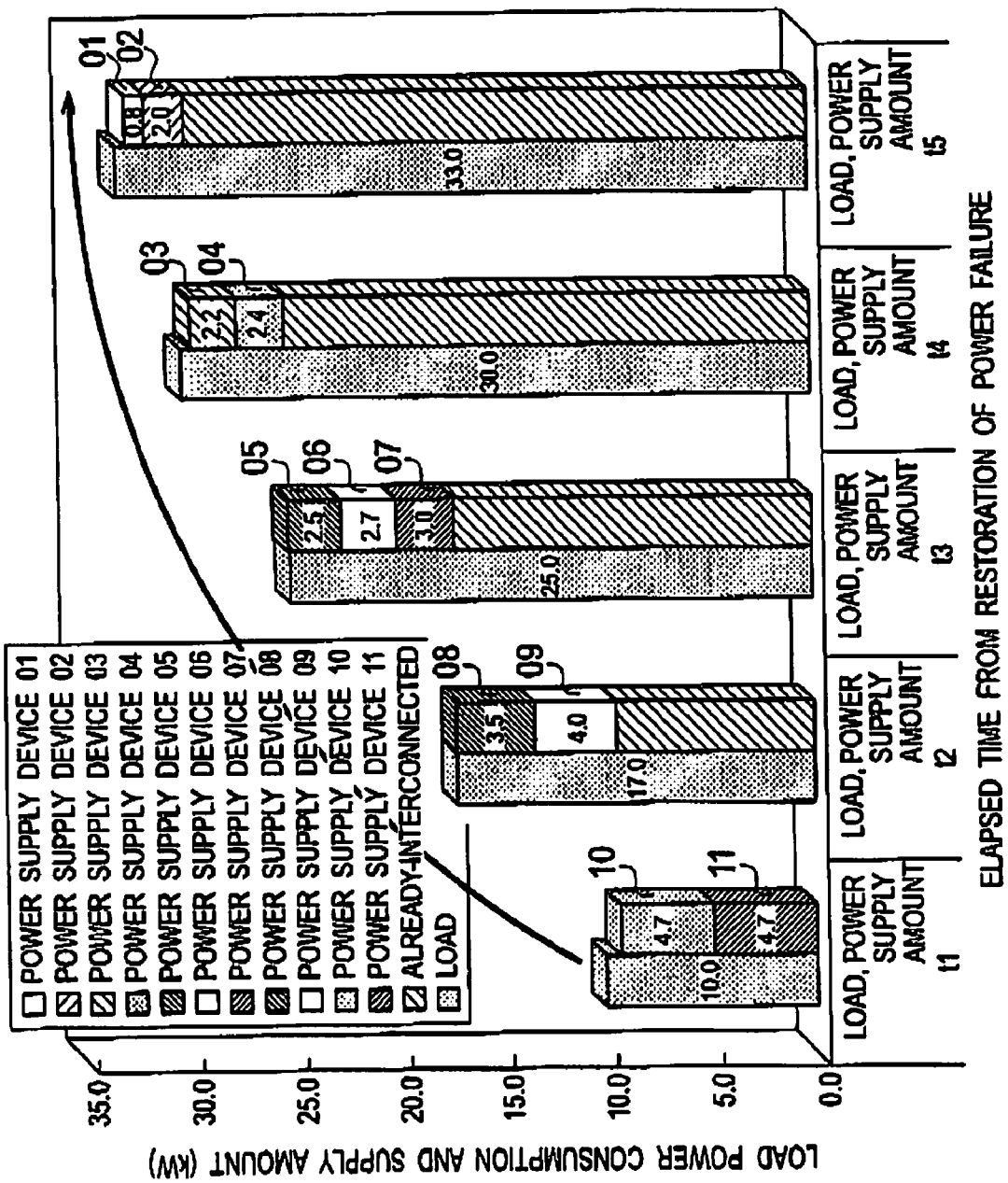
FIG. 11 is a graph for illustrating the start of grid interconnection of a power supply device according to a sixth embodiment.

Start of grid interconnection of the power supply device according to the sixth embodiment will be described below by referring to the drawings. FIG. 11 is a graph for illustrating the start of grid interconnection of the power supply device according to the sixth embodiment.

As shown in FIG. 11, when the customer 80 is a general house, an increasing amount of a load (power consumption) of power consumption is devices 31 provided in the general house is the largest immediately after a power failure is restored, and gradually becomes smaller with elapse of time. This is because the power consumption devices 31 provided in the general house are general electric home appliances and the like, and the grid interconnection of the electric home appliances starts all at once when the power failure is restored.

Accordingly, grid interconnection of the power supply devices is started from the power supply device having a larger power supply amount so that balance between the load (power consumption) of the power consumption devices 31 and the power supply amount of the power supply devices can be kept. Thereby, it becomes less likely that a power amount to be received from the bank (power transmission line 50) temporarily becomes excessively large.

(Operations of the Grid Interconnection Device)

Figure 12:
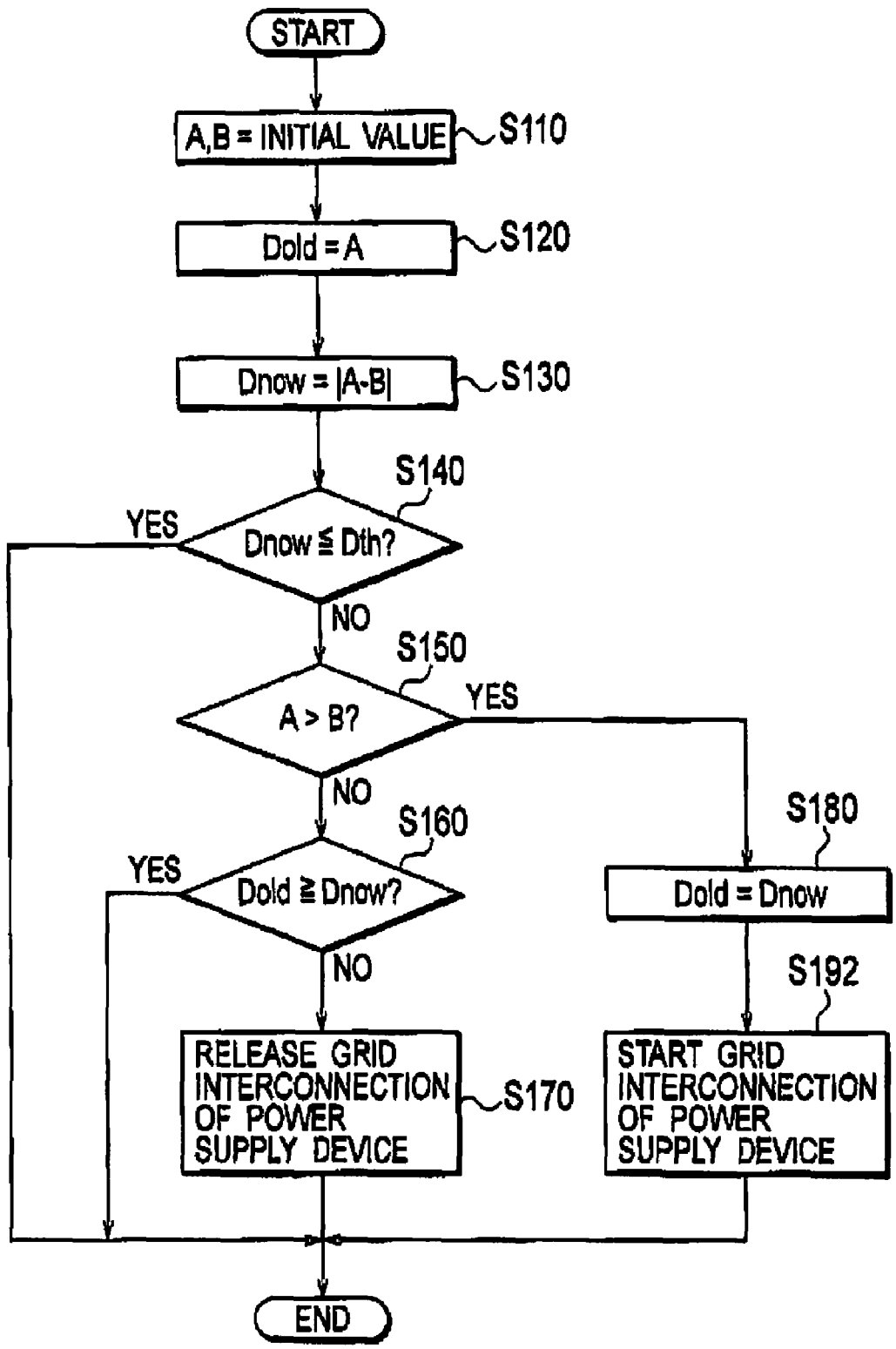
FIG. 12 is a flowchart showing operations of a grid interconnection device 100 according to a sixth embodiment.

Operations of the grid interconnection device according to the sixth so embodiment will be described below by referring to the drawings. FIG. 12 is a flowchart showing the operations of the grid interconnection device 100 according to the sixth embodiment. Note that FIG. 12 shows processes carried out at the above-described step S40 in FIG. 5.

Note that in FIG. 12, same step numbers are given to processes same as those of FIG. 10. Specifically, processes at steps S110 to S180 of FIG. 12 are same as those of FIG. 10. Accordingly, the description of the steps S110 to S180 will be omitted.

At step S192, the grid interconnection device 100 starts grid interconnection of the power supply device having the largest power supply amount among the power supply devices which have not started grid interconnection yet.

As described above, a load (A) and a power supply amount (B) may be the load of the power consumption devices 31 and the power supply amount of the power supply devices, both of which are provided to the customer 30 having the grid interconnection device 100. In this case, the order of starting grid interconnection of the power supply devices is determined based on the load of the power consumption devices 31 and the power supply amount of the power supply devices, the power consumption devices 31 and the power supply devices being provided to the customer 30 having the grid interconnection device 100.

On the other hand, as described above, the load (A) and the power supply amount (B) may be the load of the power consumption devices 31 and the power supply amount of the power supply devices, the power consumption devices 31 and the power supply devices being connected to the bank including the grid interconnection device 100. In this case, the order of grid interconnection of the power supply devices is determined based on the load of the power consumption devices 31 and the power supply amount of the power supply devices, the power consumption devices 31 and the power supply devices being connected to the bank including the grid interconnection device 100.

Seventh Embodiment

A seventh embodiment of the present invention will be described below by referring to the drawings. In the following description, differences between the above-described first to fourth embodiments and the seventh embodiment will be mainly descried.

Specifically, although it is not described in the above-described first to fourth embodiments, in the seventh embodiment, a grid interconnection device 100 compares a power supply mount of each of power supply devices with a predetermined comparison value in a case where area information included in a grid interconnection start instruction includes its own area information.

(Operation of the Grid Interconnection Device)

Figure 13:
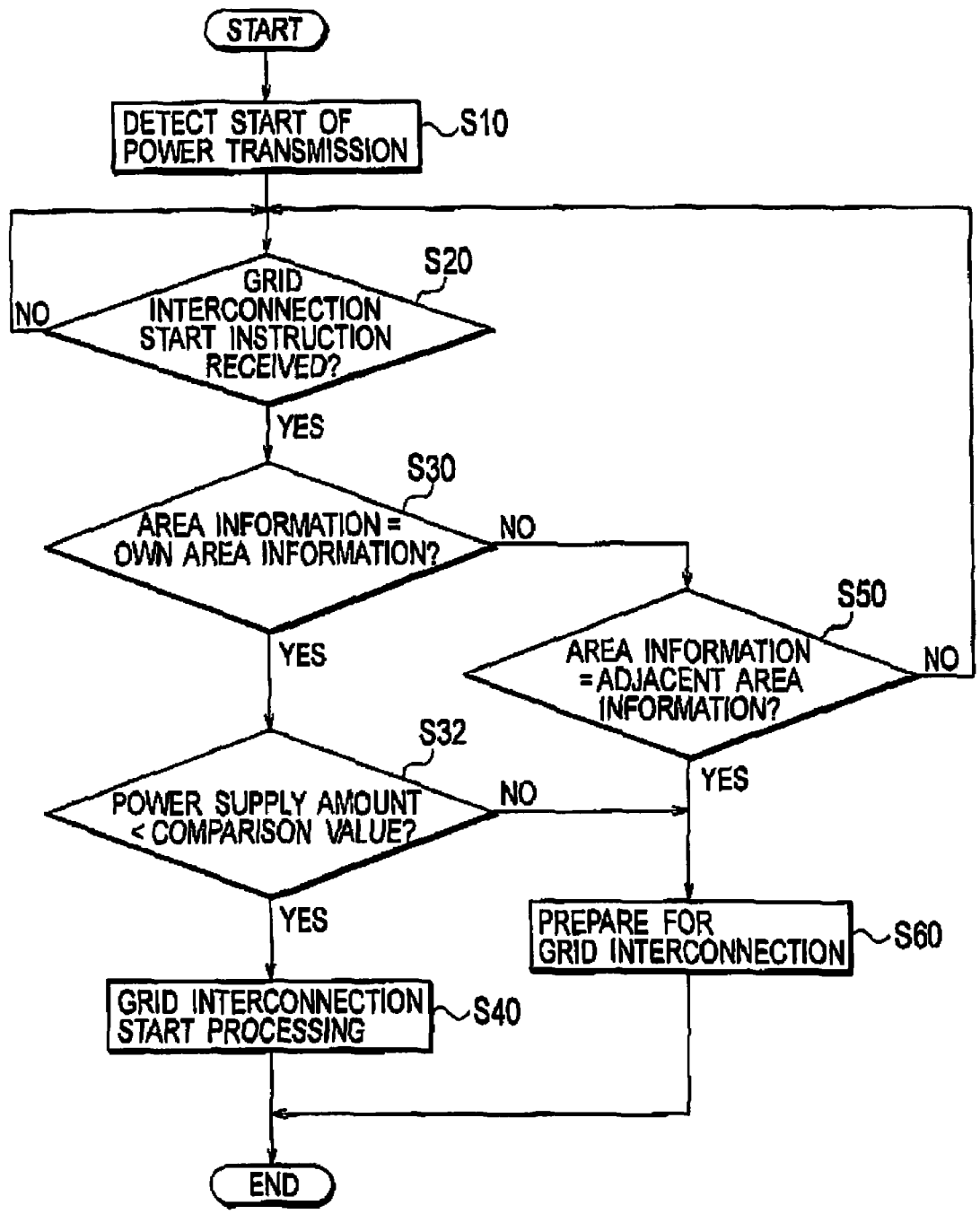
FIG. 13 is a flowchart showing operations of a grid interconnection device 100 according to a seventh embodiment.

Operations of the grid interconnection device according to the seventh embodiment will be described below by referring to the drawings. FIG. 13 is a flowchart showing the operations of the grid interconnection device 100 according to the seventh embodiment.

Note that in FIG. 13, same step numbers are given to processes same as those of FIG. 5. Specifically, processes at steps S10 to S60 of FIG. 13 are same as those of FIG. 5. Accordingly, the description of the steps S10 to S60 will be omitted.

At step S32, the grid interconnection devices 100 compares a power supply amount of a power supply device with a predetermined comparison value. If the power supply amount of the power supply device is less than the comparison value, the grid interconnection device 100 proceeds to processing at step S40. If the power supply amount of the power supply device is equal to or larger than the comparison value, the grid interconnection devices 100 proceeds to processing at step S60.

Note that the comparison value is previously determined by a substation 20 or the like. In the seventh embodiment, the comparison value increases as elapsed time from the start of alternating-current power transmission (power restoration) increases.

In addition, the grid interconnection start instruction may include power supply information (i.e., the above-described comparison value) specifying the power supply amount of each of the power supply devices starting grid interconnection with a bank. Here, the substation 20 determines the power supply information (comparison value) in consideration of the load state of power consumption devices 31 and the power supply amount of each of the power supply devices for each bank provided under the management of the substation 20. Accordingly, the grid interconnection of the power supply devices can be controlled in consideration of the load state and the power supply amount, not for each so customer 30 but for each bank.

Eighth Embodiment

An eighth embodiment will be described below by referring to the drawings. In the following description, differences between the above-described seventh embodiment and the eighth embodiment will be mainly described.

Specifically, in the above-described seventh embodiment, the grid interconnection of the power supply devices is sequentially started from the power supply device having a smaller power supply amount. In contrast, in the eighth embodiment, the grid interconnection of the power supply devices is sequentially started from the power supply device having a larger power supply amount.

(Operations of the Grid Interconnection Device)

Figure 14:
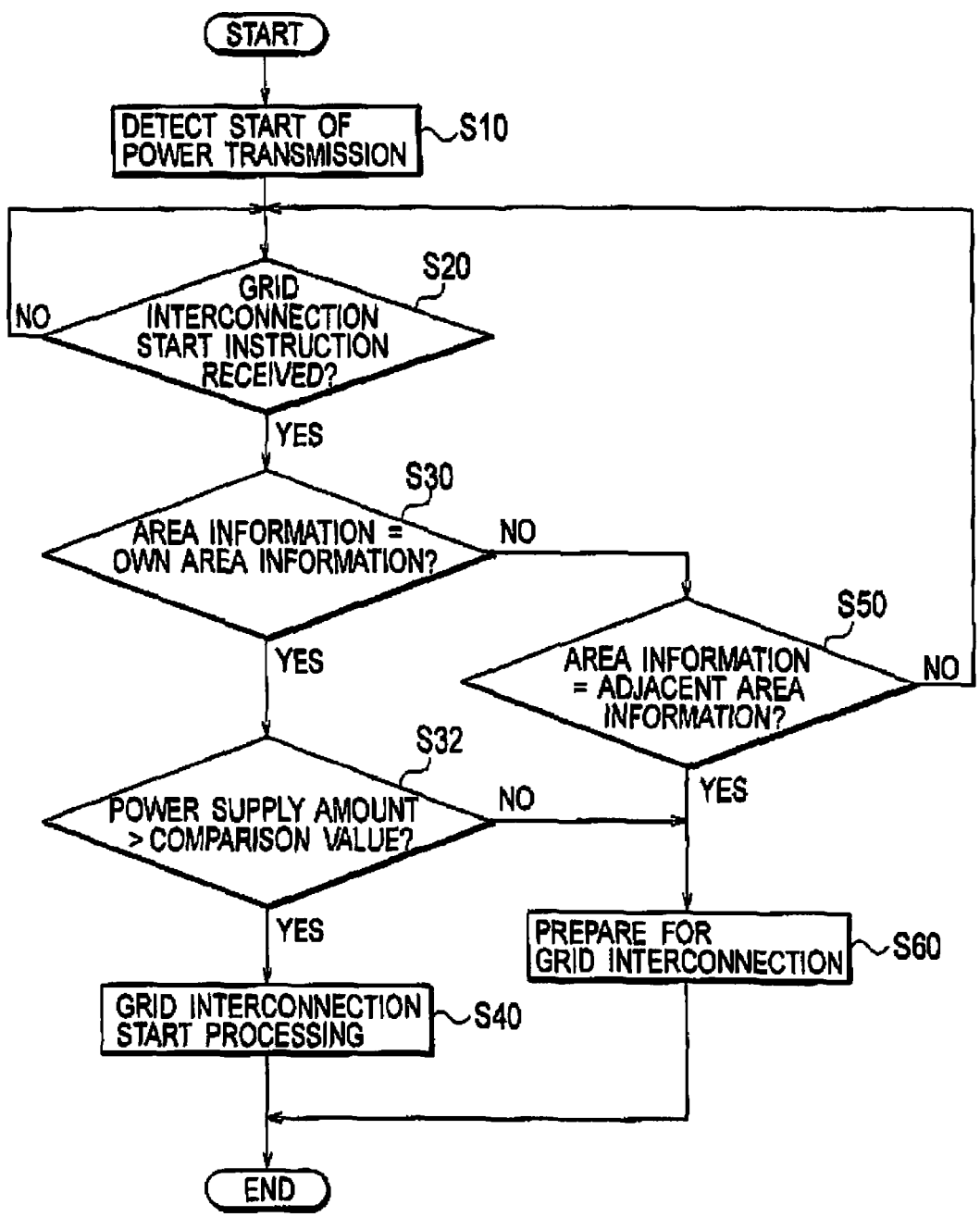
FIG. 14 is a flowchart showing operations of the grid interconnection device 100 according to an eighth embodiment.

Operations of the grid interconnection device according to the eighth embodiment will be described below by referring to the drawings. FIG. 14 is a flowchart showing the operations of a grid interconnection device 100 according to the eighth embodiment.

Note that in FIG. 14, same step numbers are given to processes same as those of FIG. 5. Specifically, processes at steps S10 to S60 of FIG. 14 are same as those of FIG. 5. Accordingly, the description of the steps S10 to S60 will be omitted.

At step S32, the grid interconnection devices 100 compares a power supply amount of a power supply device with a predetermined comparison value. If the power supply amount of the power supply device is larger than the comparison value, the grid interconnection device 100 proceeds to processing at step S40. If the power supply amount of the power supply device is equal to or less than the comparison value, the grid interconnection devices 100 proceeds to processing at step S60.

Note that the comparison value is previously determined by a substation 20 or the like. In the eighth embodiment, the comparison value decreases as elapsed time from the start of alternating-current power transmission (power restoration) increases.

In addition, a grid interconnection start instruction may include power supply information (i.e., the above-described comparison value) specifying the power supply amount of each of the power supply devices starting grid interconnection with a bank. Here, the substation 20 so determines the power supply information (comparison value) in consideration of the load state of power consumption devices 31 and the power supply amount of each of the power supply devices for each bank provided under the management of the substrate 20. Accordingly, the grid interconnection of the power supply devices can be controlled in as consideration of the load state and the power supply amount, not for each customer 30 but for each bank.

Other Embodiments

The present invention has been described by the above-described embodiments. However, it should be understood that the description and drawings constituting one part of this disclosure do not limit the present invention. Various alternative embodiments, examples, and operational techniques will be apparent from this disclosure for those skilled in the art.

For example, in the above-described embodiments, the grid interconnection start instruction is transmitted by using the data delivery area in the digital terrestrial broadcasting, but the present invention is not limited to this configuration. Specifically, the grid interconnection start instruction may be transmitted to the customers 30 through paging network, digital cellular network, 802.11X-based wireless network, BS broadcasting, CS broadcasting, CATV, analog TV broadcasting, a radio, cable broadcasting, or the like. The grid interconnection start instruction may be transmitted to the customers 30 by use of enhanced information for adjusting time of radio wave clocks. The grid interconnection start instruction may be transmitted to the customers 30 by use of network. In case of using the network, confirmation may be made at regular intervals to a server or the like, which is provided on the substation 20 side. In this case, information is updated on the server and the information becomes an instruction of grid interconnection, power system separate, or grid interconnection preparation.

In the above-described embodiments, the grid interconnection start instruction includes area information showing an area where grid interconnection between the bank and the power supply devices should be started, but the present invention is not limited to this. Specifically, the grid interconnection start instruction does not necessarily need to include area information.

The grid interconnection start instruction may include information specifying a power supply device which should start grid interconnection with the bank. In this case, it is preferable that the grid interconnection device 100 start grid interconnection of the power supply device specified by the grid interconnection start instruction and prepare for grid interconnection of the power supply device which is not specified by the grid interconnection start instruction.

Here, the grid interconnection start instruction may include information specifying the types of power supply devices, such as the power supply amount of the power supply devices (for example, 4 kw class), the power generation method of the power supply devices (for example, a solar power generation or a wind power generation). Alternatively, the grid interconnection start instruction may include information with which the power supply device can be specified, such as an identification number which is unique to the power supply device, a serial number which is allocated to the power supply device under the management of the substation 20, a registration number of grid interconnection contract, or the like.

In the above-described embodiments, the order of starting the grid interconnection of the power supply devices is stored in the grid interconnection device 100 (storage unit 103), but the present invention is not limited to this. Specifically, the order of starting the grid interconnection of the power supply devices may be included in the grid interconnection start instruction.

Although it is not particularly described in the above-described embodiments, the grid interconnection start instruction may include information specifying the type of the customer 30. In this case, it is preferable that the substation 20 transmits the grid interconnection start instruction to the customers 30 with higher priority (medical facilities, public facilities, and infrastructure facilities) prior to the customers 30 with lower priority.

Here, the grid interconnection device 100 naturally starts grid interconnection between the bank and the power supply devices in a case where the customer 30 specified by the grid interconnection start instruction is its own customer 30. In addition, the grid interconnection device 100 may prepare for grid interconnection of the power supply device when the customer 30 specified by the grid interconnection start instruction is not its own customer 30.

In the above-described embodiments, the grid interconnection start instruction is transmitted through two transmission paths to each customer 30, but the present invention is not limited to this. Specifically, the grid interconnection start instruction may be transmitted through one transmission path or through three or more of transmission paths.

In the above-described embodiments, the grid interconnection start instruction is transmitted from the substation 20, but the present invention is not limited to this. Specifically, the grid interconnection start instruction may be transmitted from other devices (such as a power company or a broadcasting station). In addition, for example, with regard to a power supply device which has little effect on a power distribution system even when it is interconnected, like a power supply device having a small power supply amount, a function to receive the grid interconnection start instruction may be stopped as appropriate, and grid interconnection may be started concurrently with a power-failure restoration.

What is claimed is:

1. A grid interconnection device connected to a power distribution system through which alternating-current power is transmitted and to a power supply device provided to a customer, the grid interconnection device comprising:
   a detector configured to detect a start of transmission of the alternating-current power based on a state of the alternating-current power;
   a receiver configured to receive a grid interconnection start instruction for starting grid interconnection between the power distribution system and the power supply device, through a predetermined transmission path
   a determination unit configured to judge that the power distribution system and the power supply device should be interconnected when the receiver receives the grid interconnection start instruction, after the detector detects a start of transmission of the alternating-current power, and
   a controller configured to control grid interconnection and power system separate of the power distribution system and the power supply device, in accordance with a result judged by the determination unit, wherein
   the controller starts grid interconnection between the power distribution system and the power supply device upon receipt of the grid interconnection start instruction in a state where the detector detects the start of transmission of the alternating-current power.

2. The grid interconnection device according to claim 1, wherein
   the grid interconnection start instruction includes information specifying the power supply device starting the grid interconnection with the power distribution system, and
   the grid determination unit determines that interconnection of the power supply device specified by the grid interconnection start instruction should be started.

3. The grid interconnection device according to claim 2, wherein grid interconnection of the power supply device other than the power supply device specified by the grid interconnection start instruction is prepared.

4. The grid interconnection device according to any one of claims 2 and 3, wherein the grid interconnection start instruction includes information specifying the type of the power supply device.

5. The grid interconnection device according to claim 1, wherein
   the grid interconnection start instruction includes area information specifying an area in which grid interconnection between the power distribution system and the power supply device to be started, and
   the determination unit determines that grid interconnection between the power distribution system and the power supply device should be started when the area specified by the area information is its own area.

6. The grid interconnection device according to claim 5, wherein the determination unit determines that grid interconnection between the power distribution system and the power supply device should be started when the area specified by the area information is an area adjacent to its own area.

7. The grid interconnection device according to claim 1, wherein the power supply device includes a plurality of power supply devices, and the order of starting grid interconnection of the plurality of power supply devices is determined based on a load state of a power consumption device provided to the customer and a power supply amount of each of the plurality of power supply devices.

8. The grid interconnection device according to claim 5, wherein
   the grid interconnection start instruction includes power supply amount information specifying a power supply amount of the power supply device which starts grid interconnection with the power distribution system, and
   the determination unit determines that grid interconnection between the power distribution system and the power supply device should be started based on the power supply amount information, when the area specified by the area information is its own area.

9. A grid interconnection system comprising:
   a grid interconnection device connected to a power distribution system through which alternating-current power is transmitted; and
   a power supply device connected to the grid interconnection device, wherein
   the grid interconnection device includes:
   a detector configured to detect a start of transmission of the alternating-current power based on a state of the alternating-current power;
   a receiver configured to receive a grid interconnection start instruction for starting grid interconnection between the power distribution system and the power supply device, through a predetermined transmission path; and
   a determination unit configured to judge that the power distribution system and the power supply device should be interconnected when the receiver receives the grid interconnection start instruction, after the detector detects a start of transmission of the alternating-current power, and a controller configured to control grid interconnection and power system separate of the power distribution system and the power supply device, in accordance with a result judged by the determination unit, and the controller starts grid interconnection between the power distribution system and the power supply device upon receipt of the grid interconnection start instruction in a state where the detector detects the start of transmission of the alternating-current power.

10. A power control system comprising:

a grid interconnection device connected to a power distribution system through which alternating-current power is transmitted;

a power supply device connected to the grid interconnection device; and a transmission device configured to transmit a grid interconnection start instruction for starting grid interconnection between the power distribution system and the power supply device, through a predetermined transmission path, wherein the grid interconnection device includes:

a detector configured to detect a start of transmission of the alternating-current power based on a state of the alternating-current power;

a receiver configured to receive the grid interconnection start instruction through the predetermined transmission path from the transmission device;

a determination unit configured to judge that the power distribution system and the power supply device should be interconnected when the receiver receives the grid interconnection start instruction, after the detector detects a start of transmission of the alternating-current power, and a controller configured to control grid interconnection and power system separate of the power distribution system and the power supply device, in accordance with a result judged by the determination unit, and the controller starts grid interconnection between the power distribution system and the power supply device upon receipt of the grid interconnection start instruction in a state where the detector detects the start of transmission of the alternating-current power.

* * * * *